United States Patent
Shin et al.

(10) Patent No.: US 10,654,553 B2
(45) Date of Patent: May 19, 2020

(54) SHIP WITH BOIL-OFF GAS LIQUEFACTION SYSTEM

(71) Applicant: DAEWOO SHIPBUILDING & MARINE ENGINEERING CO., LTD., Seoul (KR)

(72) Inventors: Hyun Jun Shin, Seoul (KR); Dong Kyu Choi, Seongnam-si (KR); Young Sik Moon, Gwangmyeong-si (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 97 days.

(21) Appl. No.: 15/579,571

(22) PCT Filed: May 16, 2016

(86) PCT No.: PCT/KR2016/005139
§ 371 (c)(1),
(2) Date: Dec. 4, 2017

(87) PCT Pub. No.: WO2016/195279
PCT Pub. Date: Dec. 8, 2016

(65) Prior Publication Data
US 2018/0170505 A1 Jun. 21, 2018

(30) Foreign Application Priority Data

Jun. 2, 2015 (KR) .................. 10-2015-0078142
Sep. 25, 2015 (KR) .................. 10-2015-0135997
Dec. 11, 2015 (KR) .................. 10-2015-0176512

(51) Int. Cl.
*B63H 21/38* (2006.01)
*F17C 9/02* (2006.01)
(Continued)

(52) U.S. Cl.
CPC .............. *B63H 21/38* (2013.01); *B63B 25/16* (2013.01); *F02M 21/0287* (2013.01); *F17C 6/00* (2013.01);
(Continued)

(58) Field of Classification Search
CPC ......... B63B 25/08; B63B 25/12; B63B 25/14; F25J 1/0025; F25J 1/0035; F25J 1/0037;
(Continued)

(56) References Cited

U.S. PATENT DOCUMENTS 6,220,053 B1   4/2001   Hass, Jr. et al.
6,901,762 B2   6/2005   Irie et al.
(Continued)

FOREIGN PATENT DOCUMENTS

CN   1820163 A      8/2006
CN   101915494 A    12/2010
(Continued)

OTHER PUBLICATIONS

Office Action in corresponding Chinese Patent Application No. 201680045324.4—7 pages (dated Feb. 1, 2019).
(Continued)

*Primary Examiner* — Ajay Vasudeva
(74) *Attorney, Agent, or Firm* — Knobbe Martens Olson & Bear LLP

(57) ABSTRACT

A ship including a liquefied gas storage tank includes: first and second compressors which compresse a boil-off gas discharged from a storage tank; a boost compressor which compresses one part of the boil-off gas that is compressed by at least any one of the first compressor and/or the second compressor; a first heat exchanger which heat exchanges the boil-off gas compressed by the boost compressor and the boil-off gas discharged from the storage tank; a refrigerant decompressing device which expands the other part of the
(Continued)

boil-off gas that is compressed by at least any one of the first compressor and/or the second compressor; a second heat exchanger which cools, by a fluid expanded by the refrigerant decompressing device as a refrigerant; and an additional compressor which is compresses the refrigerant that passes through the refrigerant decompressing device and second heat exchanger.

17 Claims, 9 Drawing Sheets

(51) Int. Cl.
*F02M 21/02* (2006.01)
*F25J 1/00* (2006.01)
*F25J 1/02* (2006.01)
*F17C 6/00* (2006.01)
*B63B 25/16* (2006.01)
*B61J 99/00* (2006.01)
*B63J 99/00* (2009.01)

(52) U.S. Cl.
CPC ............... *F17C 9/02* (2013.01); *F25J 1/004* (2013.01); *F25J 1/0025* (2013.01); *F25J 1/0037* (2013.01); *F25J 1/0045* (2013.01); *F25J 1/0202* (2013.01); *F25J 1/023* (2013.01); *F25J 1/0249* (2013.01); *F25J 1/0277* (2013.01); *F25J 1/0288* (2013.01); *F25J 1/0294* (2013.01); *B63J 2099/003* (2013.01); *F02M 21/0215* (2013.01); *F17C 2221/033* (2013.01); *F17C 2223/0161* (2013.01); *F17C 2223/033* (2013.01); *F17C 2227/0185* (2013.01); *F17C 2227/0339* (2013.01); *F17C 2227/0358* (2013.01); *F17C 2265/03* (2013.01); *F17C 2265/037* (2013.01); *F17C 2265/066* (2013.01); *F17C 2270/0105* (2013.01); *F25J 2290/72* (2013.01); *Y02T 10/32* (2013.01)

(58) Field of Classification Search
CPC .......... F25J 1/0201; F25J 1/0202; F25J 1/023; F25J 1/0235; F25J 1/0242; F25J 1/0277; F25J 1/0278; F25J 1/0288; F25J 1/0294; F25J 2210/90; F25J 2245/90; F25J 2290/72; F17C 9/02; F17C 2221/033; F17C 2223/0161; F17C 2227/0185; F17C 2227/0339; F17C 2227/0358; F17C 2265/03; F17C 2265/031; F17C 2265/032; F17C 2265/033; F17C 2265/037; F17C 2265/038; F17C 2265/066; F17C 2270/0105
See application file for complete search history.

(56) References Cited

U.S. PATENT DOCUMENTS

| | | | |
|---|---|---|---|
| 10,364,013 B2 | 7/2019 | Shin et al. | |
| 10,399,655 B2 | 9/2019 | Shin et al. | |
| 2004/0068993 A1 | 4/2004 | Irie et al. | |
| 2011/0056238 A1 | 3/2011 | Mak | |
| 2011/0056328 A1 | 3/2011 | Ko | |
| 2011/0094262 A1 | 4/2011 | Turner et al. | |
| 2012/0036888 A1 | 2/2012 | Vandor | |
| 2014/0202585 A1 | 7/2014 | Barker | |
| 2015/0330574 A1 | 11/2015 | Fuchs et al. | |
| 2016/0114876 A1 | 4/2016 | Lee et al. | |
| 2018/0148138 A1 | 5/2018 | Shin et al. | |
| 2018/0162492 A1 | 6/2018 | An et al. | |
| 2018/0170503 A1 | 6/2018 | Shin et al. | |
| 2018/0170504 A1 | 6/2018 | Shin et al. | |
| 2018/0170506 A1 | 6/2018 | Shin et al. | |
| 2018/0170507 A1 | 6/2018 | Shin et al. | |
| 2018/0327056 A1* | 11/2018 | Lee | B63B 25/16 |

FOREIGN PATENT DOCUMENTS

| | | |
|---|---|---|
| CN | 102084114 A | 6/2011 |
| CN | 102084171 A | 6/2011 |
| CN | 102660341 A | 9/2012 |
| CN | 103097237 A | 5/2013 |
| CN | 103562536 A | 2/2014 |
| EP | 2623414 A1 | 8/2013 |
| JP | H11-210993 A | 8/1999 |
| JP | 2001-132898 A | 5/2001 |
| JP | 2001-279280 A | 10/2001 |
| JP | 3213846 B2 | 10/2001 |
| JP | 56-65092 A | 4/2009 |
| JP | 2009-79665 A | 4/2009 |
| JP | 2010025152 A | 2/2010 |
| KR | 10-2002-0069390 A | 9/2002 |
| KR | 10-2006-0123675 A | 12/2006 |
| KR | 10-2008-0113046 A | 12/2008 |
| KR | 10-2010-0108932 A | 10/2010 |
| KR | 10-1153080 B1 | 6/2012 |
| KR | 10-2012-0107886 A | 10/2012 |
| KR | 10-1194474 B1 | 10/2012 |
| KR | 10-1242949 B1 | 3/2013 |
| KR | 10-2013-0062006 A | 6/2013 |
| KR | 10-1290032 B1 | 7/2013 |
| KR | 10-1298623 B1 | 8/2013 |
| KR | 10-1310025 B1 | 9/2013 |
| KR | 10-2014-0075582 A | 6/2014 |
| KR | 10-2014-0107504 A | 9/2014 |
| KR | 10-2014-0130092 | 11/2014 |
| KR | 10-2015-0001600 A | 1/2015 |
| KR | 10-1488100 B1 | 1/2015 |
| KR | 10-1490717 B1 | 2/2015 |
| KR | 10-1511214 B1 | 4/2015 |
| KR | 10-2015-0049748 A | 5/2015 |
| KR | 10-2015-0050113 A | 5/2015 |
| WO | 2004/109206 A1 | 12/2004 |
| WO | 2009/126604 A1 | 10/2009 |
| WO | 2009/136793 A1 | 11/2009 |
| WO | 2012/043274 A1 | 4/2012 |
| WO | 2012/128448 A1 | 9/2012 |
| WO | 2016126025 A1 | 2/2015 |
| WO | 2016/195229 A1 | 12/2016 |
| WO | 2016/195230 A1 | 12/2016 |
| WO | 2016/195231 A1 | 12/2016 |
| WO | 2016/195232 A1 | 12/2016 |
| WO | 2016/195233 A1 | 12/2016 |
| WO | 2016/195237 A1 | 12/2016 |
| WO | 2016/195279 A1 | 12/2016 |

OTHER PUBLICATIONS

Office Action in corresponding Chinese Patent Application No. 201680045491.9—11pages, (dated Feb. 2, 2019).
Office Action in corresponding Chinese Patent Application No. 201680045478.3—9 pages (dated Feb. 1, 2019).
Office Action in corresponding Chinese Patent Application No. 201680045502.3—11 pages (dated Feb. 2, 2019).
Partial Supplemental European Search Report in corresponding European Patent Application No. 16803584.8—21 pages (dated Feb. 19, 2019).
Extended European Search Report in corresponding European Patent Applicaton No. 16803585.5—18 pages (dated Feb. 19, 2019).
Extended European Search Report in corresponding European Patent Application No. 16803586.3—16 pages (dated Feb. 19, 2019).
Extended European Search Report in corresponding European Patent Application No. 16803587.1—17 pages (dated Feb. 19, 2019).
Extended European Search Report in corresponding European Patent Application No. 16803592.1—10 pages (dated Feb. 19, 2019).
International Search Report dated Aug. 23, 2016 of PCT/KR2016/005139 which is the parent application and its English translation—4 pages.

(56) References Cited

OTHER PUBLICATIONS

International Preliminary Report on Patentability dated Dec. 5, 2017 of of PCT/KR2016/005139 which is the parent application—5 pages.
Notice of Allowance in corresponding Korean Patent Application No. 10-2015-0176512—6 pages, (dated Apr. 25, 2016).
Office Action in corresponding Korean Patent Application No. 10-2015-0176512—6 pages, (dated Jan. 12, 2016).
Notice of Allowance in corresponding Korean Patent Application No. 10-2015-0135997—6 pages, (dated Jan. 20, 2016).
Extended European Search Report of corresponding Patent Application No. 16803634.1—15 pages (dated Jul. 3, 2019).
Notice of Allowance of corresponding Korean Patent Application No. 10-2015-0125519—4 pages (dated Apr. 7, 2016).
Notice of Allowance of corresponding Korean Patent Application No. 10-2015-0158922—2 pages (dated May 29, 2017).

\* cited by examiner

[FIG 2]
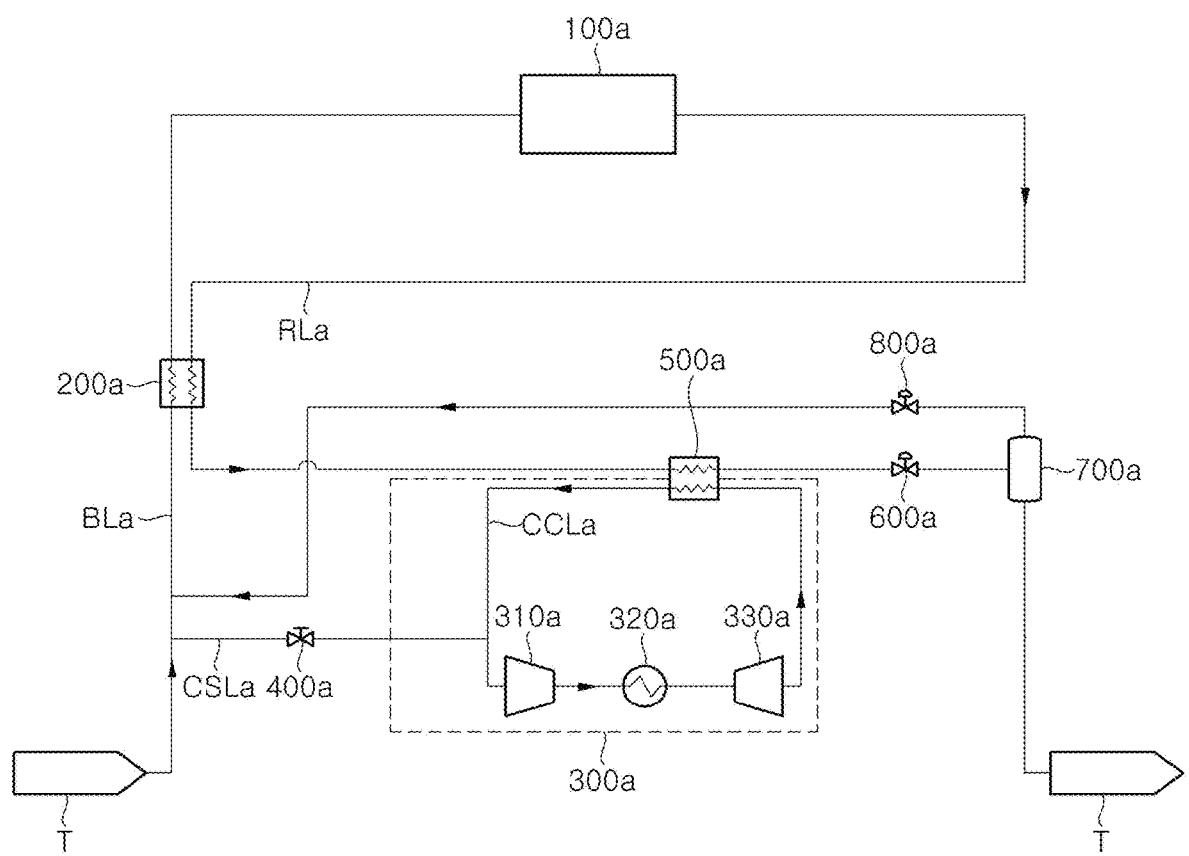

[FIG 3]
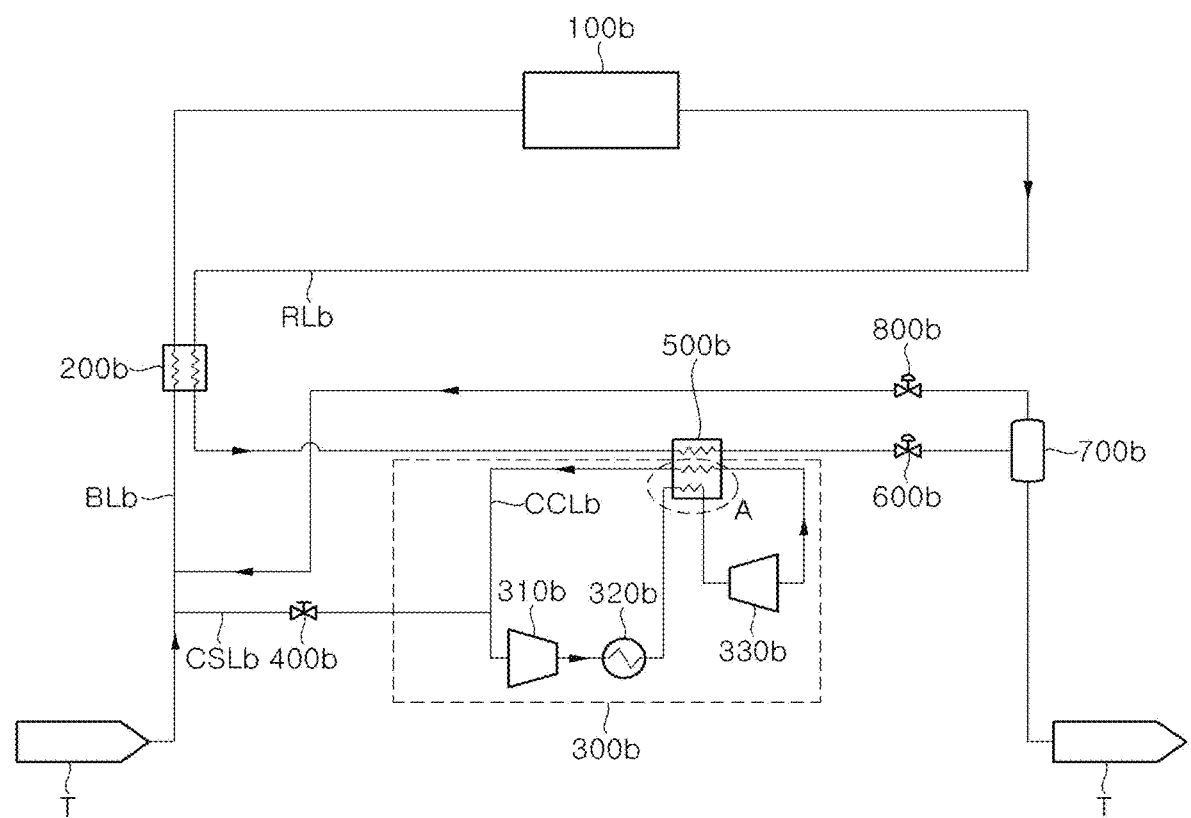

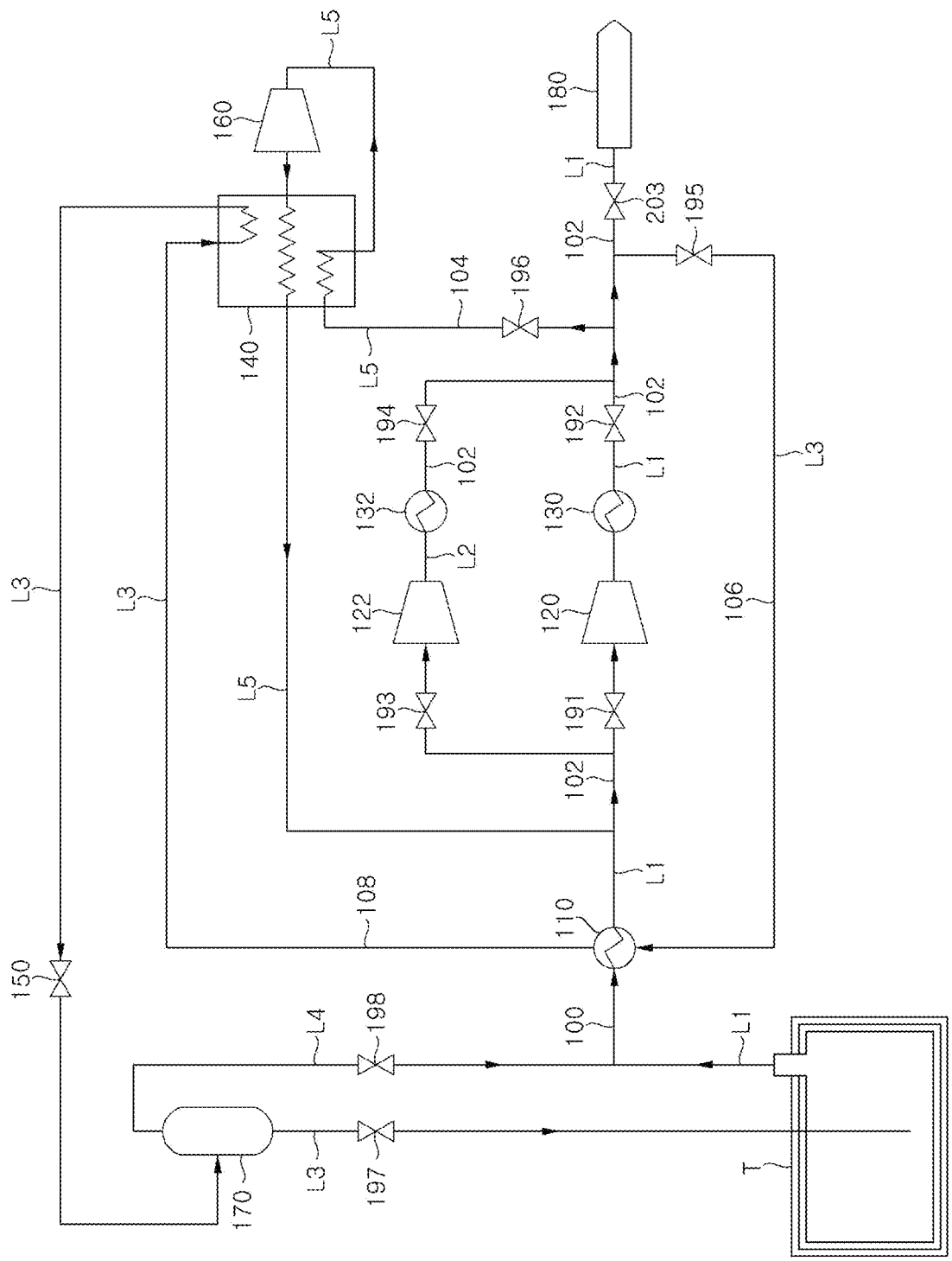
[FIG 4]

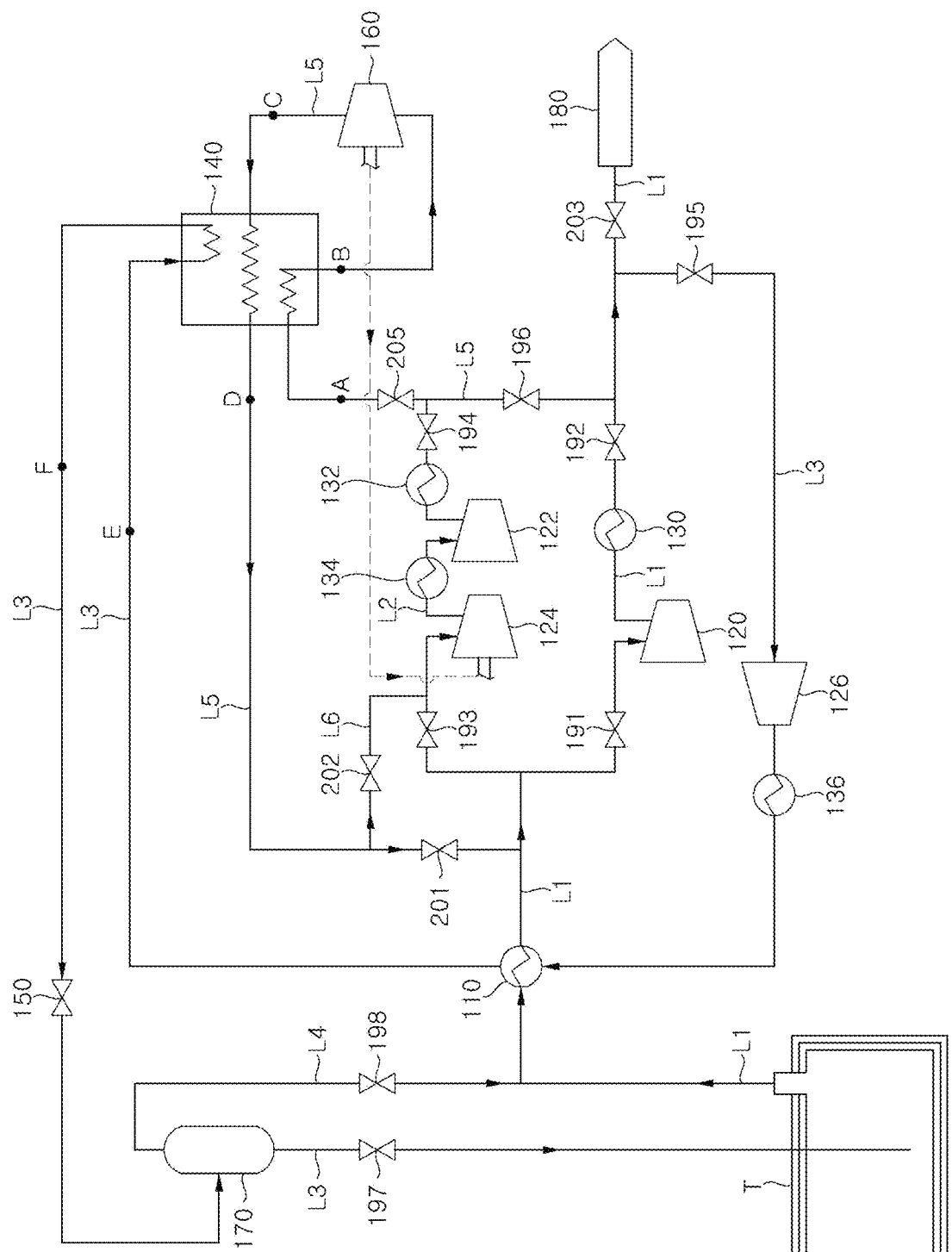
[FIG 5]

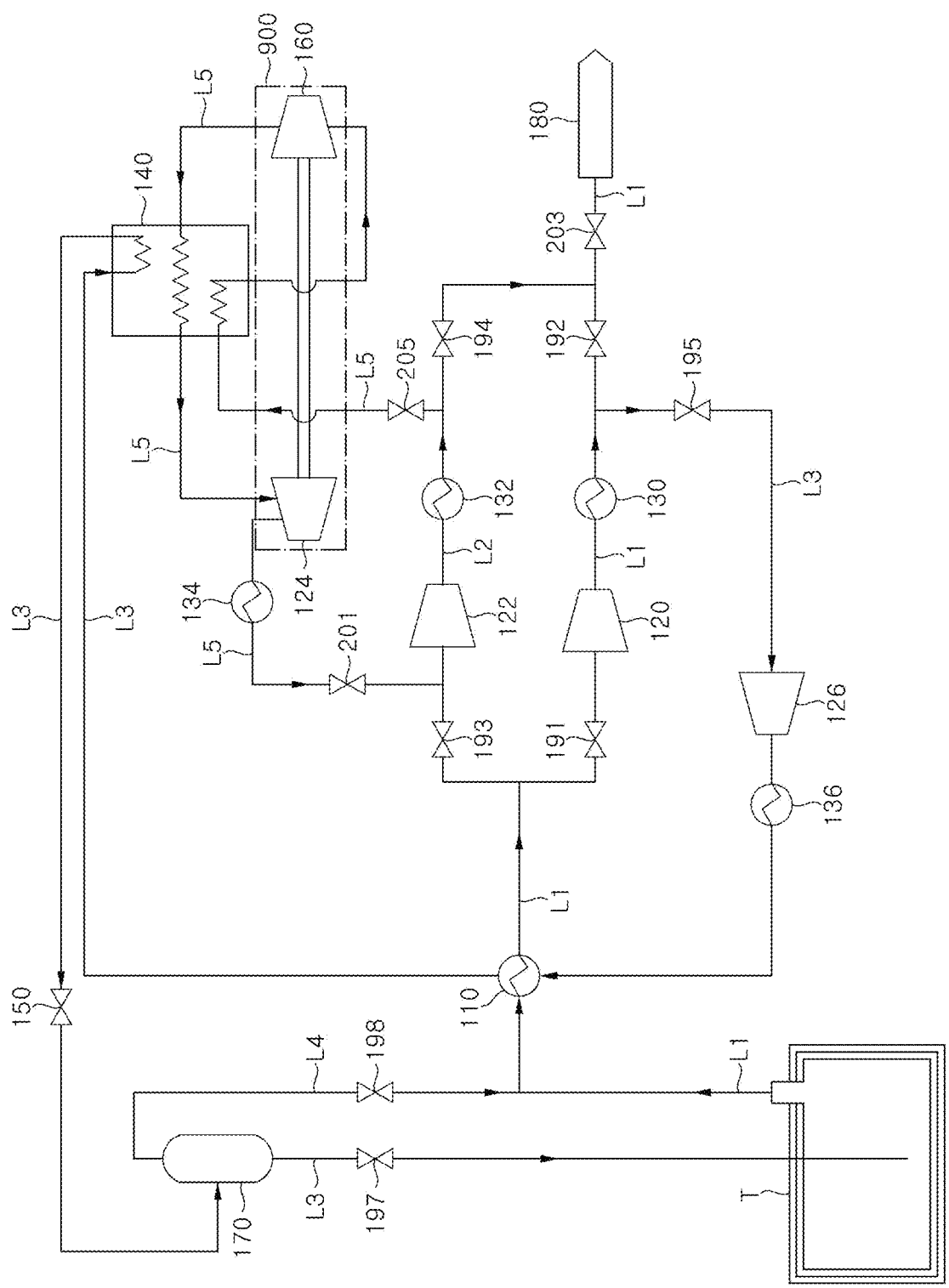

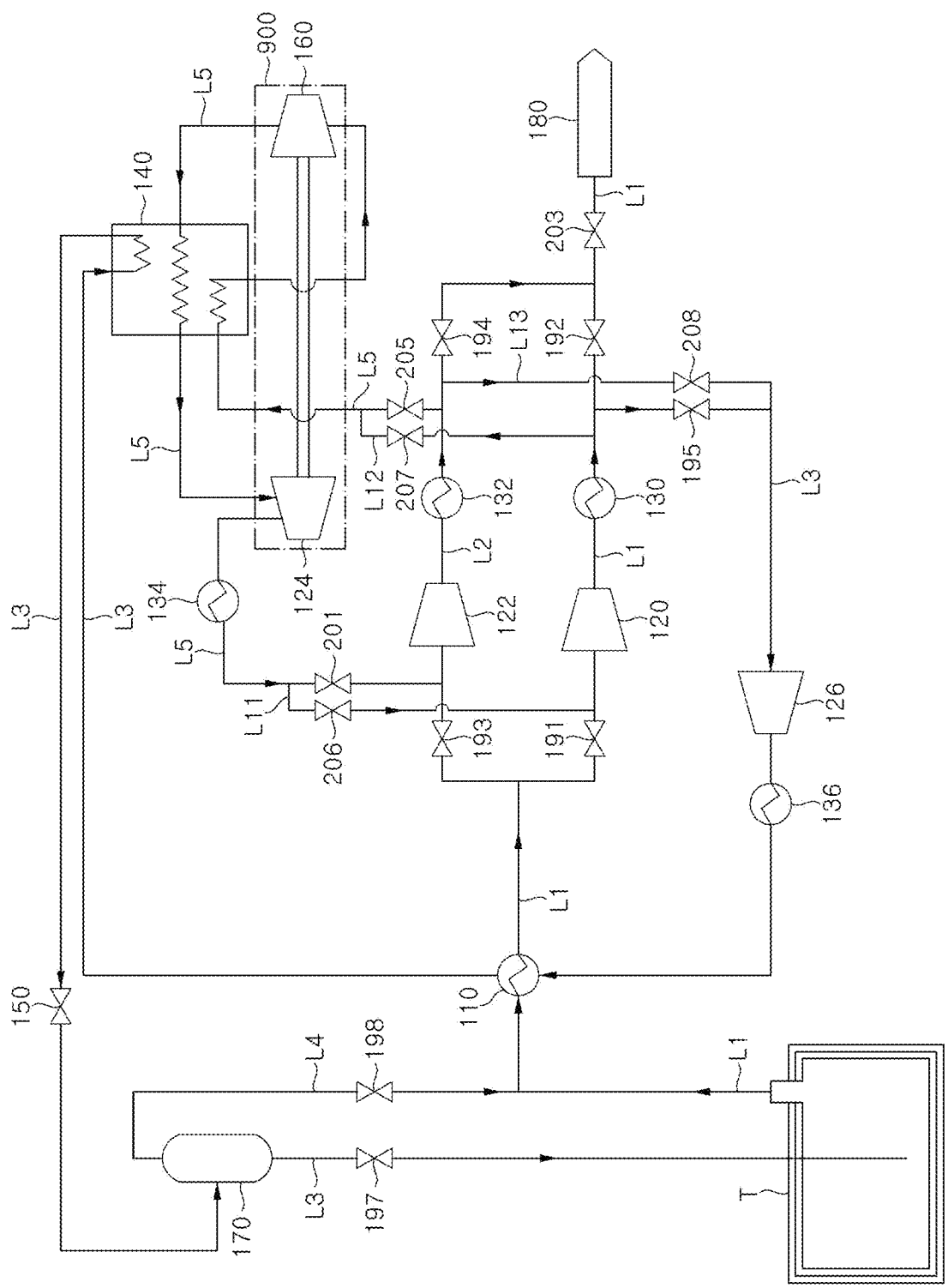
[FIG 7]

[FIG 8]
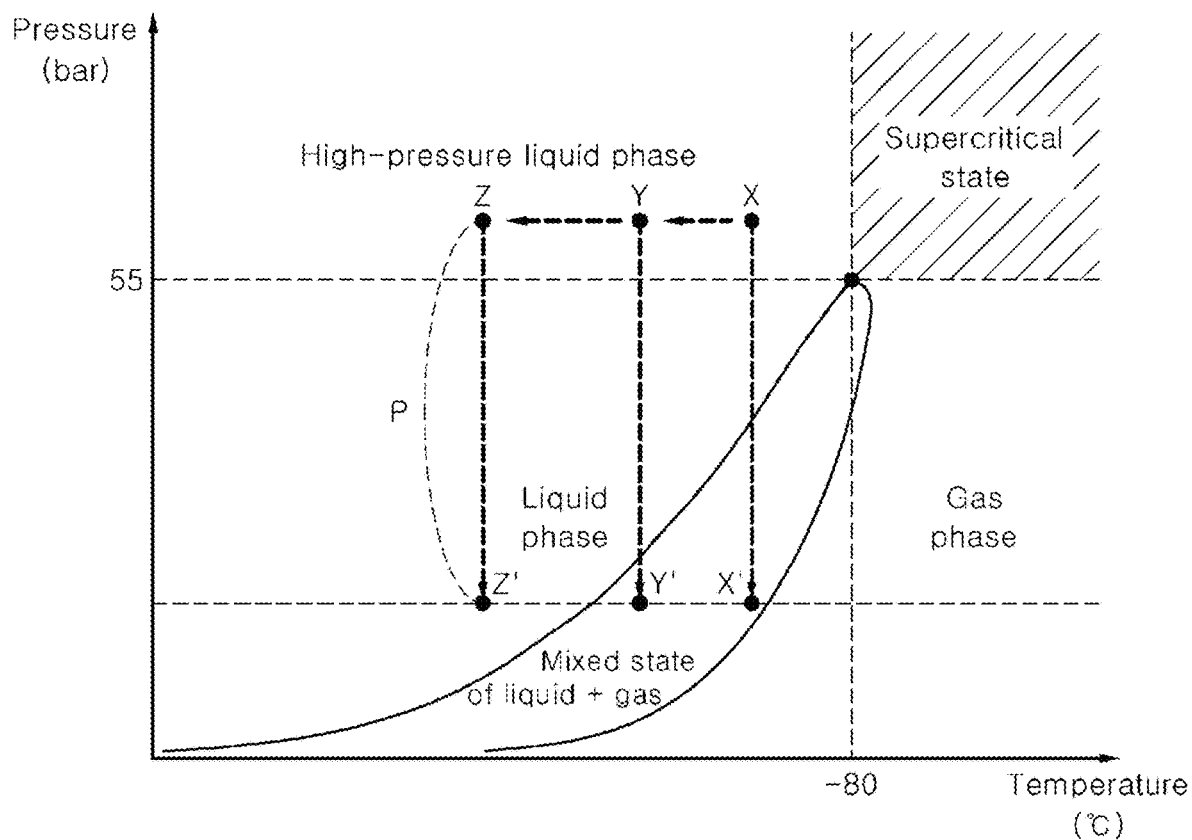

[FIG 9]
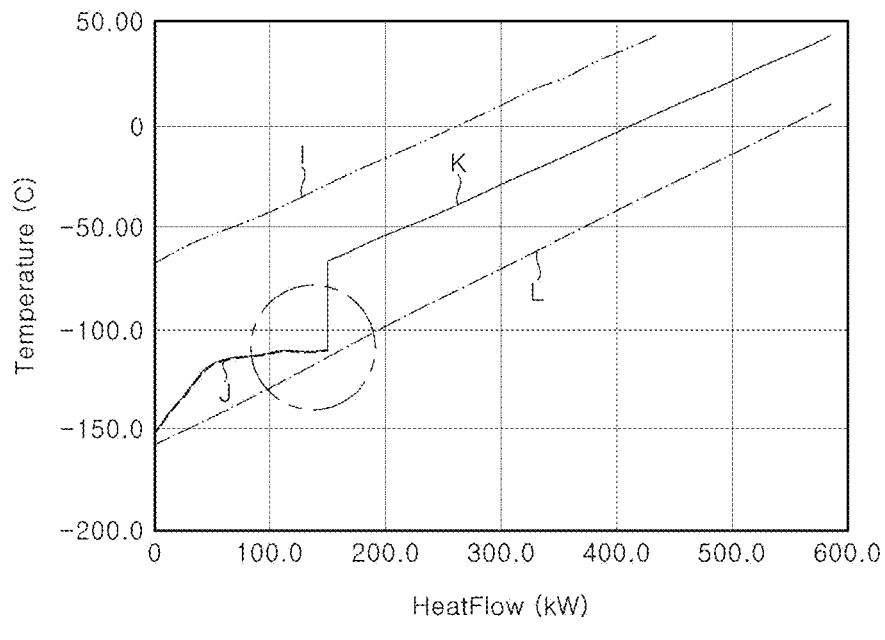
(a)
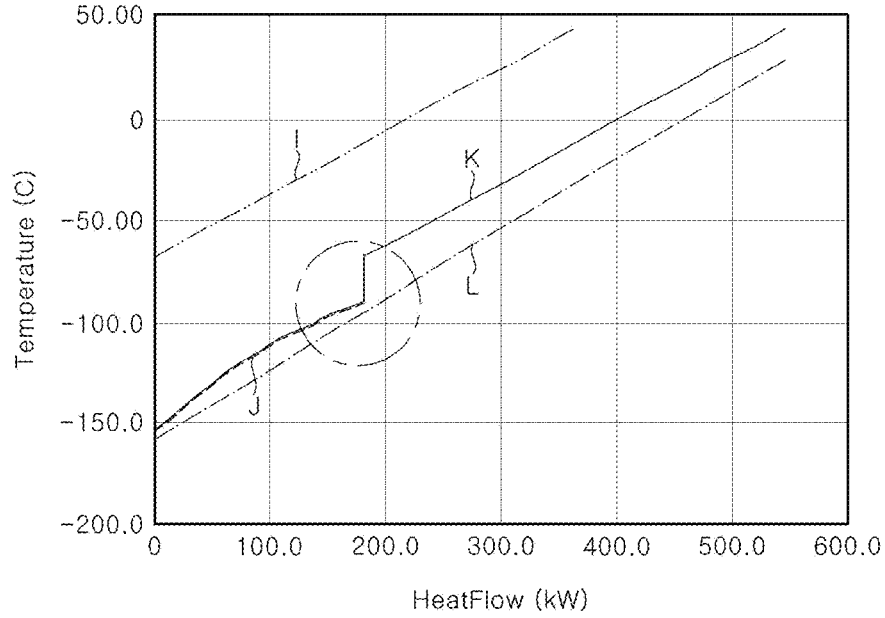
(b)

SHIP WITH BOIL-OFF GAS LIQUEFACTION SYSTEM

TECHNICAL FIELD

The present invention relates to a ship, and more particularly, to a ship including a system for re-liquefying boil-off gas left after being used as fuel of an engine among boil-off gases generated in a storage tank.

BACKGROUND ART

In recent years, consumption of liquefied gas such as liquefied natural gas (LNG) has been rapidly increasing worldwide. Since a volume of liquefied gas obtained by liquefying gas at a low temperature is much smaller than that of gas, the liquefied gas has an advantage of being able to increase storage and transport efficiency. In addition, the liquefied gas, including liquefied natural gas, can remove or reduce air pollutants during the liquefaction process, and therefore may also be considered as eco-friendly fuel with less emission of air pollutants during combustion.

The liquefied natural gas is a colorless transparent liquid obtained by cooling and liquefying methane-based natural gas to about −162° C., and has about 1/600 less volume than that of natural gas. Therefore, to very efficiently transport the natural gas, the natural gas needs to be liquefied and transported.

However, since the liquefaction temperature of the natural gas is a cryogenic temperature of −162° C. at normal pressure, the liquefied natural gas is sensitive to temperature change and easily boiled-off. As a result, the storage tank storing the liquefied natural gas is subjected to a heat insulating process. However, since external heat is continuously sent to the storage tank, boil-off gas (BOG) is generated as the liquefied natural gas is continuously vaporized naturally in the storage tank during transportation of the liquefied natural gas. This goes the same for other low-temperature liquefied gases such as ethane.

The boil-off gas is a kind of loss and is an important problem in transportation efficiency. In addition, if the boil-off gas is accumulated in the storage tank, an internal pressure of the tank may rise excessively, and if the internal pressure of the tank becomes more severe, the tank is highly likely to be damaged. Accordingly, various methods for treating the boil-off gas generated in the storage tank have been studied. Recently, to treat the boil-off gas, a method for re-liquefying boil-off gas and returning the re-liquefied boil-off gas to the storage tank, a method for using boil-off gas as an energy source for fuel consumption places like an engine of a ship, or the like have been used.

As the method for re-liquefying boil-off gas, there are a method for re-liquefying boil-off gas by heat-exchanging the boil-off gas with a refrigerant by a refrigeration cycle using a separate refrigerant, a method for re-liquefying boil-off gas by the boil-off gas itself as a refrigerant without using a separate refrigerant, or the like. In particular, the system employing the latter method is called a partial re-liquefaction System (PRS).

Generally, on the other hand, as engines which can use natural gas as fuel among engines used for a ship, there are gas fuel engines such as a DFDE engine and an ME-GI engine.

The DFDE engine adopts an Otto cycle which consists of four strokes and injects natural gas with a relatively low pressure of approximately 6.5 bars into a combustion air inlet and compresses the natural gas as the piston lifts up.

The ME-GI engine adopts a diesel cycle which consists of two strokes and employs a diesel cycle which directly injects high pressure natural gas near 300 bars into the combustion chamber around a top dead point of the piston. Recently, there is a growing interest in the ME-GI engine, which has better fuel efficiency and boost efficiency.

DISCLOSURE

Technical Problem

An object of the present invention is to provide a ship including a system capable of providing better boil-off gas re-liquefying performance than the existing partial re-liquefaction system.

Technical Solution

According to an exemplary embodiment of the present invention, there is provided a ship storing a storage tank storing liquefied gas, including: a first compressor which compresses one or more parts of a boil-off gas discharged from the storage tank; a second compressor which compresses the other part of the boil-off gas discharged from the storage tank; a boost compressor which compresses a part of the boil-off gas that is compressed by at least any one of the first compressor and the second compressor; a first heat exchanger which heat-exchanges the boil-off gas compressed by the boost compressor and the boil-off gas discharged from the storage tank; a refrigerant decompressing device which expands the other part of the boil-off gas that is compressed by at least any one of the first compressor and/or the second compressor; a second heat exchanger which cools, by a fluid expanded by the refrigerant decompressing device as a refrigerant, the boil-off gas that is compressed by the boost compressor and heat-exchanged by the first heat exchanger; an additional compressor which compresses the refrigerant that passes through the refrigerant decompressing device and second heat exchanger; and a first decompressing device which expands the fluid that is compressed by the boost compressor and then cooled by the first heat exchanger and the second heat exchanger, wherein the additional compressor is driven by power generated from the expanding of the fluid by the refrigerant decompressing device.

The boost compressor may compress only the boil-off gas compressed by the first compressor and the refrigerant decompressing device may expand only the boil-off gas compressed by the second compressor.

The additional compressor may compress the refrigerant passing through the second heat exchanger and sent the compressed refrigerant to the second compressor.

The additional compressor may compress the refrigerant passing through the second heat exchanger and sent the compressed refrigerant to the first compressor and the second compressor.

The boost compressor may compress a part of the boil-off gas compressed by the first compressor and the second compressor and the refrigerant decompressing device may expand the other part of the boil-off gas compressed by the first compressor and the second compressor.

The boil-off gas sent to the second heat exchanger may primarily pass through the second heat exchanger, be expanded by the refrigerant decompressing device, and then sent back to the second heat exchanger, and the fluid which is expanded by the refrigerant decompressing device and then used as a refrigerant in the refrigerant decompressing device may cool both of the fluid sent to the second heat exchanger before passing through the refrigerant decompressing device and the boil-off gas compressed by the boost compressor and then cooled by the first heat exchanger.

The ship may further include a gas-liquid separator that separates a partially re-liquefied liquefied gas passing through the boost compressor, the first heat exchanger, the second heat exchanger, and the first decompressing device and the boil-off gas remaining in a gas phase, in which the liquefied gas separated by the gas-liquid separator may be sent to the storage tank, and the boil-off gas separated by the gas-liquid separator may be sent to the first heat exchanger.

A part of the boil-off gas sent to the boost compressor may be branched from an upstream of the boost compressor to be supplied to the fuel consumption place.

The ship may form a refrigerant cycle of a closed loop in which the boil-off gas circulates the second compressor, the refrigerant decompressing device, the second heat exchanger, and the additional compressor.

According to another exemplary embodiment of the present invention, there is provided a ship storing a storage tank storing liquefied gas, including: a first compressor which compresses one or more parts of a boil-off gas discharged from the storage tank; a second compressor which compresses the other part of the boil-off gas discharged from the storage tank; a boost compressor which compresses a part of the boil-off gas that has been compressed by at least any one of the first compressor and the second compressor; a first heat exchanger which heat exchanges the boil-off gas compressed by the boost compressor and the boil-off gas discharged from the storage tank; a refrigerant decompressing device which expands the other part of the boil-off gas that has been compressed by at least any one of the first compressor and the second compressor; a second heat exchanger which cools, by a fluid expanded by the refrigerant decompressing device as a refrigerant, the boil-off gas that is compressed by the boost compressor and heat exchanged by the first heat exchanger; an additional compressor which compresses the refrigerant that has passed through the refrigerant decompressing device and second heat exchanger; and a first decompressing device which expands the fluid that has been compressed by the boost compressor and then cooled by the second heat exchanger, wherein the additional compressor is driven by power generated from the expanding of the fluid by the refrigerant decompressing device.

According to another exemplary embodiment of the present invention, there is provided a boil-off gas treatment system of a ship, including a storage tank storing liquefied gas, including: a first supply line along which a part of boil-off gas discharged from the storage tank is compressed by a first compressor and then is sent to a fuel consumption place; a second supply line which is branched from the first supply line, and has a second compressor installed thereon, the second compressor compressing the other part of the boil-off gas discharged from the storage tank; a return line which is branched from the first supply line, the compressed boil-off gas being additionally compressed by a boost compressor and then passing through a first heat exchanger, a second heat exchanger, and a refrigerant decompressing device to be re-liquefied; a recirculation line along which the boil-off gas cooled by passing through the second heat exchanger and the refrigerant decompressing device is sent back to the second heat exchanger to be used as a refrigerant; and an additional compressor which is installed on an upstream of the second compressor to compress the boil-off gas, wherein the additional compressor is driven by power generated from expanding of a fluid by the refrigerant decompressing device, the first heat exchanger heat-exchanges and cools the boil-off gas supplied along the return line after being compressed by the boost compressor by the boil-off gas discharged from the storage tank as the refrigerant, the second heat exchanger heat-exchanges and cools both of the boil-off gas supplied along the recirculation line and the boil-off gas supplied along the return line by the boil-off gas passing through the refrigerant decompressing device as the refrigerant.

The additional compressor may be installed on the second supply line.

The additional compressor may be installed on the recirculation line on the downstream of the refrigerant decompressing device and the second heat exchanger.

The boil-off gas treatment system of a ship may further include a first additional line connecting between the recirculation line on the downstream of the refrigerant decompressing device and the second heat exchanger and the second supply line on an upstream of the second compressor.

The refrigerant cycle of the closed loop in which the boil-off gas passes through the additional compressor, the second compressor, the second heat exchanger, the refrigerant decompressing device, and the second heat exchanger and is then supplied to the additional compressor via the first additional line may be formed.

The boil-off gas compressed by the first compressor and the boil-off gas compressed by the second compressor may be joined, and a part thereof may be re-liquefied along the return line, the other part thereof may pass through the second heat exchanger, the refrigerant decompressing device, and the second heat exchanger along the recirculation line and may then be discharged from the storage tank to be joined with the fluid passing through the first heat exchanger, and the remaining part thereof may be supplied to the fuel consumption place.

A part of the boil-off gas compressed by the first compressor may be re-liquefied along the return line, the other part thereof may be supplied to the fuel consumption place, and the boil-off gas compressed by the second compressor may pass through the second heat exchanger, the refrigerant decompressing device, and the second heat exchanger along the recirculation line and may then be discharged from the storage tank to be joined with the fluid passing through the first heat exchanger.

The refrigerant cycle of the closed loop in which the boil-off gas circulates the second compressor, the second heat exchanger, the refrigerant decompressing device, the second heat exchanger, and the additional compressor may be formed.

The boil-off gas treatment system of a ship may further include: a second additional line which is branched from the recirculation line on the downstream of the additional compressor and connected to the first supply line on the upstream of the first compressor; a third additional line which is branched from the first supply line on the downstream of the first compressor and connected to the recirculation line on the upstream of the refrigerant decompressing device and the second heat exchanger; and a fourth additional line which is branched from the second supply line on the downstream of the second compressor and connected to the return line on the upstream of the boost compressor.

The boil-off gas treatment system of a ship may form the refrigerant cycle of the closed loop in which the boil-off gas is compressed by the second compressor and then passes through the second heat exchanger, the refrigerant decompressing device, the second heat exchanger, and the additional compressor along the recirculation line and is supplied to the second compressor.

The boil-off gas treatment system of a ship may form the refrigerant cycle of the closed loop in which the boil-off gas is compressed by the first compressor and is then supplied to the second heat exchanger along the third additional line and the recirculation line, and passes through the refrigerant decompressing device, the second heat exchanger, and the additional compressor and is supplied back to the first compressor along the second additional line.

According to an exemplary embodiment of the present invention, there is provided a method including: branching boil-off gas discharged from a liquefied gas storage tank into two and compressing one flow of the branched boil-off gas by a first compressor and the other flow by a second compressor, additionally compressing and re-liquefying the boil-off gas, which is compressed by the first compressor, by a boost compressor and then returning the re-liquefied boil-off gas to the storage tank; circulating the boil-off gas compressed by the second compressor through the refrigerant cycle to use the boil-off gas compressed by the first compressor as a refrigerant; and compressing a fluid circulating the refrigerant cycle by the boost compressor and then supplying the compressed fluid to the second compressor.

Advantageous Effects

Compared with the existing partial re-liquefaction system (PRS), the present invention can increase the re-liquefaction efficiency and the re-liquefaction amount since the boil-off gas is decompressed after undergoing the additional cooling process by the second heat exchanger. In particular, most or all of the remaining boil-off gas can be re-liquefied without employing the refrigeration cycle using the separate refrigerant, and therefore increasing the economical efficiency.

Further, according to the present invention, it is possible to flexibly control the refrigerant flow rate and the supply of cold heat in response to the discharge amount of the boil-off gas, the engine load depending on the operating speed of the ship, and the like.

According to the embodiment of the present invention, it is possible to contribute to securing the space on the ship and save the cost of additionally installing the compressor by increasing the re-liquefaction efficiency and the re-liquefaction amount by using the extra compressor already provided. In particular, the second heat exchanger can use not only the boil-off gas compressed by the extra compressor but also the boil-off gas compressed by the main compressor as the refrigerant to increase the flow rate of the boil-off gas used as the refrigerant in the second heat exchanger, thereby more increasing the re-liquefaction efficiency and the re-liquefaction amount.

According to another embodiment of the present invention, since the mass of the fluid used as the refrigerant in the second heat exchanger after being compressed by the second compressor is larger, the re-liquefaction efficiency and the re-liquefaction amount in the second heat exchanger can be increased and the power produced by the refrigerant decompressing device can be utilized.

According to the present invention, the pressure of the boil-off gas undergoing the re-liquefaction process can be increased due to the additionally included boost compressor, thereby further increasing the re-liquefaction efficiency and the re-liquefaction amount.

BRIEF DESCRIPTION OF THE DRAWINGS

FIG. 2 is a configuration diagram schematically showing a boil-off gas treatment system for a ship according to a first embodiment of the present invention.

FIG. 3 is a configuration diagram schematically showing a boil-off gas treatment system for a ship according to a second embodiment of the present invention.

FIG. 4 is a configuration diagram schematically showing a boil-off gas treatment system for a ship according to a third embodiment of the present invention.

FIG. 5 is a configuration diagram schematically showing a boil-off gas treatment system for a ship according to a fourth embodiment of the present invention.

FIG. 6 is a configuration diagram schematically showing a boil-off gas treatment system for a ship according to a second embodiment of the present invention.

FIG. 7 is a configuration diagram schematically showing a boil-off gas treatment system for a ship according to a sixth embodiment of the present invention.

FIG. 8 is a graph schematically illustrating a phase change of methane depending on temperature and pressure.

FIG. 9 shows graphs showing temperature values of methane depending on a heat flow under different pressures.

BEST MODE

Figure 1:
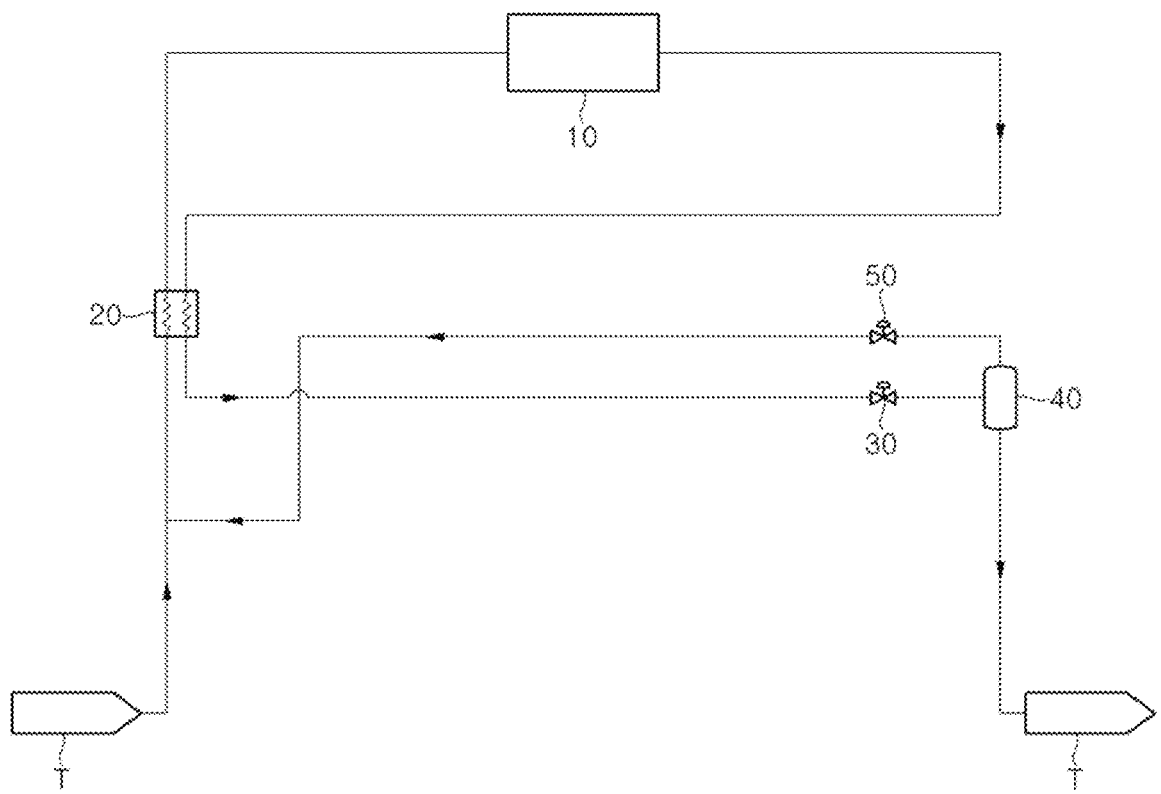
FIG. 1 is a configuration diagram schematically showing the existing partial re-liquefaction system.

Hereinafter, configurations and effects of exemplary embodiments of the present invention will be described with reference to the accompanying drawings. The present invention can variously be applied to ships such as a ship equipped with an engine using natural gas as fuel and a ship including a liquefied gas storage tank. In addition, the following embodiments may be changed in various forms, and therefore the technical scope of the present invention is not limited to the following embodiments.

Systems for treating boil-off gas of the present invention to be described below can be applied to offshore structures such as LNG FPSO and LNG FSRU, in addition to all types of ships and offshore structures equipped with a storage tank capable of storing a low-temperature fluid cargo or liquefied gas, i.e., ships such as a liquefied natural gas carrier, a liquefied ethane gas carrier, and LNG RV. However, for convenience of explanation, the following embodiments will describe, by way of example, liquefied natural gas which is a typical low-temperature fluid cargo.

Further, a fluid on each line of the present invention may be in any one of a liquid phase, a gas-liquid mixed state, a gas phase, and a supercritical fluid state, depending on operating conditions of a system.

FIG. 1 is a configuration diagram schematically showing the existing partial re-liquefaction system.

Referring to FIG. 1, in the conventional partial re-liquefaction system, the boil-off gas generated and discharged from a storage tank storing a fluid cargo is sent along a pipe and compressed by a boil-off gas compressor 10.

A storage tank T is provided with a sealing and heat insulating barrier to be able to store liquefied gas such as liquefied natural gas at a cryogenic temperature. However, the sealing and heat insulating barrier may not completely shut off heat transmitted from the outside. Therefore, the liquefied gas is continuously evaporated in the storage tank, so an internal pressure of the storage tank may be increased. Accordingly, to prevent the pressure of the tank from excessively increasing due to the boil-off gas and keep the internal pressure of the tank at an appropriate level, the boil-off gas in the storage tank is discharged and is then supplied to the boil-off compressor 10.

When the boil-off gas discharged from the storage tank and compressed by the boil-off gas compressor 10 is referred to as a first stream, the first stream of the compressed boil-off gas is divided into a second stream and a third stream, and the second stream may be formed to be liquefied and then return to the storage tank T, and the third stream may be formed to be supplied to gas fuel consumption places such as a boost engine and a power generation engine in a ship. In this case, in the boil-off gas compressor 10 can compress the boil-off gas to a supply pressure of the fuel consumption place, and the second stream may be branched via all or a part of the boil-off gas compressor if necessary. All of the boil-off gas compressed as the third stream may also be supplied according to the amount of fuel required for the fuel consumption place, and all of the compressed boil-off gas may return to the storage tank by supplying the whole amount of compressed boil-off gas as the second stream. An example of the gas fuel consumption places may include a DF generator, a gas turbine, DFDE, and the like, in addition to high pressure gas injection engine (e.g., ME-GI engines developed by MDT Co., etc.) and low-pressure gas injection engines (e.g., generation X-dual fuel engine (X-DF engine) by Wartsila Co.).

At this time, a heat exchanger 20 is provided to liquefy the second stream of the compressed boil-off gas. The boil-off gas generated from the storage tank is used as a cold heat supply source of the compressed boil-off gas. The compressed boil-off gas, that is, the second stream, whose temperature rises while being compressed by the boil-off gas compressor while passing through the heat exchanger 20 is cooled, and the boil-off gas generated from the storage tank and introduced into the heat exchanger 20 is heated and then supplied to the boil-off gas compressor 10.

Since a flow rate of pre-compressed boil-off gas is compressed is greater than that of the second stream, the second stream of the compressed boil-off gas may be at least partially liquefied by receiving cold heat from the pre-compressed boil-off gas. As described above, the heat exchanger heat-exchanges the low-temperature boil-off gas immediately after being discharged from the storage tank with the high-pressure boil-off gas compressed by the boil-off gas compressor to liquefy the high-pressure boil-off gas.

The boil-off gas of the second stream passing through the heat exchanger 20 is further cooled while being decompressed by passing through an expansion means 30 such as an expansion valve or an expander and is then supplied to a gas-liquid separator 40. The gas-liquid separator 40 separates the liquefied boil-off gas into gas and liquid components. The liquid component, that is, the liquefied natural gas returns to the storage tank, and the gas component, that is, the boil-off gas is discharged from the storage tank to be joined with a flow of boil-off gas supplied to the heat exchanger 20 and the boil-off gas compressor 10 or is then supplied back to the heat exchanger 20 to be utilized as a cold heat supply source which heat-exchanges high-pressure boil-off gas compressed by the boil-off gas compressor 10. Of course, the boil-off gas may be sent to a gas combustion unit (GCU) or the like to be combusted or may be sent to a gas consumption place (including a gas engine) to be consumed. Another expansion means 50 for additionally decompressing the gas separated by the gas-liquid separator before being joined with the flow of boil-off gas may be further provided.

FIG. 2 is a configuration diagram schematically showing a boil-off gas treatment system for a ship according to a first embodiment of the present invention.

Referring to FIG. 2, the system of the present embodiment includes a refrigerant circulator 300a which is supplied with boil-off gas generated from a low temperature fluid cargo stored in a storage tank and circulates the boil-off gas as a refrigerant.

To this end, the system includes a refrigerant supply line CSLa which supplies boil-off gas from the storage tank to a refrigerant circulator 300a. The refrigerant supply line is provided with a valve 400a to shut off the refrigerant supply line CSLa if a sufficient amount of boil-off gas, which may circulate the refrigerant circulator, is supplied, such that the refrigerant circulator 300a is operated as a closed loop.

Similar to the above-described basic embodiment, even in the first modified embodiment, a first compressor 100a for compressing the boil-off gas generated from the low-temperature fluid cargo in the storage tank T is also provided. The boil-off gas generated from the storage tank is introduced into the first compressor 100a along a boil-off gas supply line BLa.

The storage tank (T) of the present embodiment may be an independent type tank in which a load of the fluid cargo is not directly applied to a heat insulating layer, or a membrane type tank in which the load of the cargo is directly applied to the heat insulating layer. The independent type tank can be used as a pressure vessel which is designed to withstand a pressure of 2 barg or more.

Meanwhile, in the present embodiment, only a line for re-liquefying the boil-off gas is shown. However, the boil-off gas compressed by the first compressor 100a may be supplied as fuel to a fuel consumption place including a boost engine and a power generation engine of a ship or an offshore structure and there may be no re-liquefied boil-off gas when the fuel consumption may consume the whole amount of boil-off gas. When a ship is anchored, there is little or no consumption of gas fuel, the whole amount of boil-off gas may also be supplied to a re-liquefaction line RLa.

The compressed boil-off gas is supplied to a first heat exchanger 200a along the boil-off gas re-liquefaction line RLa. The first heat exchanger 200a is provided over the boil-off gas re-liquefaction line RLa and the boil-off gas supply line BLa to exchange heat between boil-off gas introduced into the first compressor 100a and the boil-off gas compressed by at least a part of the first compressor 100a. The boil-off gas whose temperature rises during the compression is cooled through the heat exchange with the low-temperature boil-off gas which is generated from the storage tank and is to be introduced into the first compressor 100a.

A downstream of the first heat exchanger 200a is provided with a second heat exchanger 500a. The boil-off gas, which is compressed and then heat-exchanged by the first heat exchanger 200a is additionally cooled by the heat exchange with the boil-off gas which circulates the refrigerant circulator 300a.

The refrigerant circulator 300a includes a refrigerant compressor 310a which compresses the boil-off gas supplied from the storage tank, a first cooler 320a which cools the boil-off gas compressed by the refrigerant compressor, and a refrigerant decompressing device 330a which decompresses and additionally cools the boil-off gas cooled by the first cooler 320a. The refrigerant decompressing device 330a may be an expansion valve or an expander which adiabatically expands and cools the boil-off gas.

The boil-off gas cooled by the refrigerant decompressing device 330a is supplied as a refrigerant to the second heat exchanger 500a along the refrigerant circulation line CCLa.

The second heat exchanger 500a cools the boil-off gas by the heat exchange with the boil-off gas supplied via the first heat exchanger 200a. The boil-off gas of the refrigerant circulation line CCLa passing through the second heat exchanger 500a is circulated to the refrigerant compressor 310a and circulates the refrigerant circulation line while undergoing the above-described compression and cooling processes.

Meanwhile, the boil-off gas of the boil-off gas re-liquefaction line RLa cooled by the second heat exchanger 500a is decompressed by a first decompressing device 600a. The first decompressing device 600a may be an expansion valve, such as a Joule-Thomson valve, or an expander.

The decompressed boil-off gas is separated into gas and liquid by being supplied to a gas-liquid separator 700a on a downstream of the first decompressing device 600a, and the liquid separated by the gas-liquid separator 700a, that is, the liquefied natural gas is supplied to the storage tank T and again stored.

The gas separated by the gas-liquid separator 700a, that is, the boil-off gas is additionally decompressed by a second decompressing device 800a, and is joined with the flow of boil-off gas to be introduced into the first heat exchanger 200a from the storage tank T or is supplied to the first heat exchanger 200a to be utilized as the cold heat supply source which heat-exchanges a high-pressure boil-off gas compressed by the first compressor 100a. Of course, the boil-off gas may be sent to a gas combustion unit (GCU) or the like to be combusted or may be sent to a fuel consumption place (including a gas engine) to be consumed.

FIG. 3 is a configuration diagram schematically showing a boil-off gas treatment system for a ship according to a second embodiment of the present invention.

Referring to FIG. 3, according to the present embodiment, in a refrigerant circulator 300b, the boil-off gas which is to be introduced into a refrigerant decompressing device 330b from a first cooler 320b is cooled by exchanging heat with the boil-off gas decompressed by the refrigerant decompressing device 330b and then supplied to the refrigerant decompressing device 330b.

Since the boil-off gas is cooled while being decompressed by the refrigerant decompressing device 330b, the boil-off gas on the downstream of the refrigerant decompressing device has temperature lower than that of the boil-off gas on the upstream of the refrigerant decompressing device. In this regard, according to the present embodiment, the boil-off gas on the upstream of the refrigerant decompressing device is cooled by exchanging heat with the boil-off gas on the downstream of the refrigerant decompressing device and then introduced into the decompressing device. To this end, as illustrated in FIG. 3, the boil-off gas on the upstream of the refrigerant decompressing device 330b may be supplied to the second heat exchanger 500b (portion A of FIG. 3). If necessary, a separate heat exchanging device which may exchange heat between the boil-off gases on the upstream and the downstream of the refrigerant decompressing device may be additionally provided.

As described above, the system of the present embodiments can re-liquefy and store the boil-off gas generated from the storage tank fluid cargo, thereby increasing the transportation rate of the fluid cargo. In particular, even when the consumption of fuel on the in-ship gas consumption places is small, the gas can be combusted by the gas combustion unit (GCU) or the like to prevent the pressure of the storage tank from increasing to reduce or eliminate the amount of wasted cargo, thereby preventing a waste of energy.

In addition, the boil-off gas is circulated as the refrigerant to be utilized as the cold heat source for re-liquefaction, thereby effectively re-liquefying the boil-off gas without configuring the separate refrigerant cycle, and the separate refrigerant need not be supplied to contribute to securing the in-ship space and increase the economical efficiency. In addition, if the refrigerant is insufficient in the refrigerant cycle, the refrigerant may be replenished from the storage tank to be smoothly replenished and the refrigerant cycle may be effectively operated.

As described above, the boil-off gas may be re-liquefied by using the cold heat of the boil-off gas itself in multiple steps, so that the system configuration for treating the in-ship boil-off gas can be simplified and the cost required to install and operate the apparatus for complicated boil-off gas treatment can be saved.

FIG. 4 is a configuration diagram schematically showing a boil-off gas treatment system for a ship according to a third embodiment of the present invention.

Referring to FIG. 4, the ship of the present embodiment includes: a first heat exchanger 110 which is installed on a downstream of the storage tank T; a first compressor 120 and an second compressor 122 which are installed on a downstream of the first heat exchanger 110 to compress boil-off gas discharged from the storage tank T; a first cooler 130 which lowers temperature of the boil-off gas compressed by the first compressor 120; an second cooler 132 which lowers the temperature of the boil-off gas compressed by the second compressor 122; a first valve 191 which is installed on an upstream of the first compressor 120; a second valve 192 which is installed on a downstream of the first cooler 130; a third valve 193 which is installed on an upstream of the second compressor 122; a fourth valve 194 which is installed on a downstream of the second cooler 132; a second heat exchanger 140 which additionally cools the boil-off gas cooled by the first heat exchanger 110; a refrigerant decompressing device 160 which expands the boil-off gas passing through the second heat exchanger 140 and then sends the expanded boil-off gas back to the second heat exchanger 140; and a first decompressing device 150 which expands the boil-off gas additionally cooled by the second heat exchanger 140.

The boil-off gas, which is naturally generated from the storage tank T and then discharged, is supplied to a fuel consumption place 180 along the first supply line L1. The first heat exchanger 110 is installed on the first supply line L1 and recovers cold heat from the boil-off gas immediately after being discharged from the storage tank T. The ship of the present embodiment may further include an eleventh valve 203 which is installed on the upstream of the fuel consumption place 180 to control a flow rate of the boil-off gas sent to the fuel consumption place 180 and opening/closing thereof.

The first heat exchanger 110 is supplied with the boil-off gas discharged from the storage tank T and uses the boil-off gas supplied to the first heat exchanger 110 along the return line L3 as a refrigerant. The fifth valve 195 which controls the flow rate of the boil-off gas and opening/closing thereof may be installed on a return line L3.

The first compressor 120 and the second compressor 122 compress the boil-off gas passing through the first heat exchanger 110. The first compressor 120 is installed on the first supply line L1 and the second compressor 122 is installed on the second supply line L2. The second supply line L2 is branched from the first supply line L1 on the upstream of the first compressor 120 and connected to the first supply line L1 on the downstream of the first compressor 120. In addition, the first compressor 120 and the second compressor 122 are installed in parallel, and may have the same performance.

In general, the ship is additionally provided with the second compressor 122 and the second cooler 132 for preparing for the case where the first compressor 120 and the first cooler 130 fail. In general, the second compressor 122 and the second cooler 132 are not used at normal times when the first compressor 120 or the first cooler 130 does not fail.

That is, typically, at normal times when the first compressor 120 or the first cooler 130 does not fail, the third valve 193 on an upstream of the second compressor 122 and the fourth valve 194 on a downstream of the second cooler 132 are closed so that the boil-off gas is supplied to the fuel consumption place 180 via the first compressor 120 and the first cooler 130, and when the first compressor 120 or the first cooler 130 fails, the third valve 193 on the upstream of the second compressor 122 and the fourth valve 194 on the downstream of the second cooler 132 are open and the first valve 191 on the upstream of the first compressor 120 and the second valve 192 on a downstream of the first cooler 130 are closed so that the boil-off gas is supplied to the fuel consumption place 180 via the second compressor 122 and the second cooler 132.

The present invention is to increase the re-liquefaction efficiency and re-liquefaction amount of the boil-off gas by using the second compressor 122 and the second cooler 132 which are not used even if they are installed in the existing ship, and sends a part of the boil-off gas compressed by the second compressor 122 to the fuel consumption place 180 and uses the other part of the boil-off gas as a refrigerant which additionally cools the boil-off gas in the second heat exchanger 140.

FIG. 8 is a graph schematically illustrating a phase change of methane depending on temperature and pressure. Referring to FIG. 8, methane becomes a supercritical fluid state at a temperature of approximately −80° C. or higher and a pressure of approximately 55 bars or higher. That is, in the case of methane, a critical point is approximately −80° C. and 55 bars. The supercritical fluid state is a third state different from a liquid phase or a gas phase.

On the other hand, if the supercritical fluid states has a temperature lower than the critical point at a pressure equal to or higher than the critical point, it may also be a state similar to a supercritical state in which a density is high, unlike a general liquid phase. Here, the state of the boil-off gas having a pressure equal to or higher than the critical point and a temperature equal to lower than the critical point is referred to as a "high-pressure liquid phase".

The boil-off gas compressed by the first compressor 120 or the second compressor 122 may be in a gaseous state or in a supercritical fluid state depending on how much the boil-off gas is compressed.

When the boil-off gas sent to the first heat exchanger 110 through the return line L3 is in a gas phase, the temperature of the boil-off gas is lowered while the boil-off gas passes through the first heat exchanger 110, and thus the boil-off gas may be a mixed state of liquid and gas. In the case of the supercritical fluid state, the temperature of the boil-off gas is lowered while the boil-off gas passes through the first heat exchanger 110 and thus the boil-off gas may be the "high-pressure liquid phase".

The temperature of the boil-off gas cooled by the first heat exchanger 110 is further lowered while the boil-off gas passes through the second heat exchanger 140. When the boil-off gas passing through the first heat exchanger 110 is in the mixed state of liquid and gas, the temperature of the boil-off gas is further lowered while the boil-off gas passes through the second heat exchanger 140 and thus the boil-off gas becomes the mixed state in which a ratio of liquid is higher or becomes the liquid phase and in the case of the "high-pressure liquid phase", the temperature of the boil-off gas is further lowered while the boil-off gas passes through the second heat exchanger 140.

Further, even when the boil-off gas which passes through the second heat exchanger 140 is in the "high-pressure liquid phase", the pressure of the boil-off gas is lowered while the boil-off gas passes through the first decompressing device 150, and thus the boil-off gas becomes low in a liquid phase or the mixed state of liquid and gas.

It can be appreciated that even if the pressure of the boil-off gas is lowered to the same level (P in FIG. 8) by the first decompressing device 150, the boil-off gas becomes the mixed state in which the ratio of the liquid is higher in the case where the boil-off gas is decompressed in the higher temperature (X X' in FIG. 8) than in the case where the boil-off gas is decompressed in the lower temperature (Y Y' in FIG. 8). Further, it can be appreciated that if the temperature may be further lowered, the boil-off gas can theoretically be re-liquefied 100% (Z→Z' in FIG. 8). Therefore, if the boil-off gas is cooled once more by the second heat exchanger 140 before passing through the first decompressing device 150, the re-liquefaction efficiency and the re-liquefaction amount can be increased.

Referring back to FIG. 4, compared with the first and second embodiments in which the refrigerant circulators 300a and 300b for additionally cooling the boil-off gas are configured as the closed loop, the present embodiment is different from the first and second embodiments in that the refrigerant cycle is configured as the open loop.

In the first and second embodiments, the refrigerant circulators 300a and 300b are configured as the closed loop, and thus the boil-off gas compressed by the refrigerant compressors 310a and 310b is used only as a refrigerant in the second heat exchangers 500a and 500b but may not be sent to the fuel consumption place or may not undergo the re-liquefaction process.

On the other hand, in the present embodiment, the refrigerant cycle is configured as the open loop, and thus the boil-off gas compressed by the second compressor 122 is joined with the boil-off gas compressed by the first compressor 120, and then a part of the joined boil-off gas is sent to the fuel consumption place 180, the other part thereof is used as the refrigerant in the second heat exchanger 140 along the recirculation line L5, and the remaining part thereof undergoes the re-liquefaction process along the return line L3.

The recirculation line L5 is a line which is branched from the first supply line L1 on the downstream of the first compressor 120 and connected to the first supply line L1 on the upstream of the first compressor 120. A sixth valve 196 which controls the flow rate of the boil-off gas and the opening/closing thereof may be installed on the recirculation line L5 along which the boil-off gas branched from the first supply line L1 is sent to the second heat exchanger 140.

Compared with the first and second embodiments in which the refrigerant cycle is configured as the closed loop, the present embodiment in which the refrigerant cycle is configured as the open loop is greatly different from the first and second embodiments in that the downstream line of the first compressor 120 and the downstream line of the second compressor 122 are connected. That is, in the present embodiment, the second supply line L2 on the downstream of the second compressor 122 is connected to the first supply line L1 on the downstream of the first compressor 120, and thus the boil-off gas compressed by the second compressor 122 is joined with the boil-off gas compressed by the first compressor 120 and then sent to the second heat exchanger 140, the fuel consumption place 180, or the first heat exchanger 110. The present embodiment includes all other modifications in which the downstream line of the first compressor 120 and the downstream line of the second compressor 122 are connected.

Therefore, according to the present embodiment, upon the increase in the demanded amount of the fuel consumption place 180 such as the increase in the operating speed of the ship, the boil-off gas compressed by the second compressor 122 as well as the boil-off gas compressed by the first compressor 120 may be sent to the fuel consumption place 180.

Generally, however, since the first compressor 120 and the second compressor 122 are designed to have a capacity of approximately 1.2 times the amount required in the fuel consumption place 180, the case in which the boil-off gas compressed by the second compressor 122 exceeding the capacity of the first compressor 120 is sent to the fuel consumption place 180 little occurs. Rather, since the boil-off gas discharged from the storage tank T are entirely not consumed in the fuel consumption place 180 and therefore the boil-off gas to be re-liquefied increases, the case in which a large amount of refrigerant is required to re-liquefy a large amount of boil-off gas is more frequent.

According to the present embodiment, since not only the boil-off gas compressed by the first compressor 120 but also the boil-off gas compressed by the second compressor 122 may be used as the refrigerant for the heat exchange in the second heat exchanger 140, the boil-off gas supplied to the second heat exchanger 140 along the return line L3 after passing through the first heat exchanger 110 may be cooled to a lower temperature by using more refrigerant and the overall re-liquefaction efficiency and re-liquefaction amount may be increased. Theoretically, 100% re-liquefaction is possible.

Generally, upon determining the capacity of the compressors 120 and 122 provided in the ship, both of the capacity required for supplying the boil-off gas to the fuel consumption place 180 and the capacity required for re-liquefying the boil-off gas remaining by being not completely consumed in the fuel consumption place 180 are considered. According to the present embodiment, since the re-liquefaction amount may be increased by using the second compressor 122, the capacity required for re-liquefaction may be reduced, and thus small-capacity compressors 120 and 122 can be provided. Reducing the capacity of the compressor can save both equipment installation costs and operating costs.

In the present embodiment, at normal times when the first compressor 120 or the first cooler 130 does not fail, not only the first valve 191 and the second valve 192 but also the third valve 193 and the fourth valve 194 are open so that all of the first compressor 120, the first cooler 130, the second compressor 122, and the second cooler 132 are operated, and when the first compressor 120 or the first cooler 130 fails, increasing the re-liquefaction efficiency and the re-liquefaction amount is abandoned and the first valve 191 and the second valve 192 are closed so that the system is operated only by the boil-off gas passing through the second compressor 122 and the second compressor 132.

For convenience of explanation, it is described that the first compressor 120 and the first cooler 130 play a major role and the second compressor 122 and the second cooler 132 play an auxiliary role. However, the first compressor 120 and the second compressor 122 and the first cooler 130 and the second cooler 132 play the same role. At least two compressors and coolers which play the same role are installed in one ship, and therefore when any one of the two compressors fails, the other unbroken compressor may be used, which may satisfy a redundancy concept. Next, the above description is applied.

Therefore, as in the case in which the first compressor 120 or the first cooler 130 fails, even in the case in which the second compressor 122 or the second cooler 132 fails, increasing the re-liquefaction efficiency and the re-liquefaction amount is abandoned, and the third valve 193 and the fourth valve 194 are closed so that the system is operated only the boil-off gas passing through the first compressor 120 and the first cooler 130.

On the other hand, when the ship is operated at a high speed enough that most or all of the boil-off gas discharged from the storage tank T can be used as fuel for the fuel consumption place 180, there is little or no amount of boil-off gas to be re-liquefied. Accordingly, when the ship is operated at a high speed, only one of the first compressor 120 and the second compressor 122 may be operated.

The first compressor 120 and the second compressor 122 may compress the boil-off gas to a pressure required by the fuel consumption place 180. The fuel consumption place 180 may be an engine, a generator, or the like which are operated by the boil-off gas as fuel. For example, if the fuel consumption place 180 is a boost engine for a ship, the first compressor 120 and the second compressor 122 may compress the boil-off gas to a pressure of approximately 10 to 100 bars.

In addition, the first compressor 120 and the second compressor 122 may also compress the boil-off gas to a pressure of approximately 150 bars to 400 bars when the fuel consumption place 180 is an ME-GI engine, and when the fuel consumption place 180 is a DFDE, the boil-off gas may be compressed to a pressure of approximately 6.5 bars, and when the fuel consumption place 180 is an X-DF engine, the boil-off gas may be compressed to a pressure of approximately 16 bars.

The fuel consumption place 180 may also include various kinds of engines. For example, when the fuel consumption place 180 includes the X-DF engine and the DFDE, the first compressor 120 and the second compressor 122 may compress the boil-off gas to the pressure required by the X-DF engine, and the decompressing device is installed on the upstream of the DFDE to lower a part of the boil-off gas compressed at the pressure required by the X-DF engine to a pressure required by the DFDE and then supply the compressed boil-off gas to the DFDE.

In addition, in order to increase the re-liquefaction efficiency and the re-liquefaction amount in the first heat exchanger 110 and the second heat exchanger 140, the first compressor 120 or the second compressor 122 compresses the boil-off gas so that the pressure of the boil-off gas exceeds the pressure required by the fuel consumption place 180, and the decompressing device is installed on the upstream of the fuel consumption place 180 to lower the pressure of the compressed boil-off gas to exceed the pressure required by the fuel consumption place 180 to the pressure required by the fuel consumption place 180 and then supply the compressed boil-off gas to the fuel consumption place 180.

Meanwhile, the first compressor 120 and the second compressor 122 may each be a multi-stage compressor. FIG. 4 illustrates that one compressor 120 or 122 compresses the boil-off gas to the pressure required by the fuel consumption place 180, but when the first compressor 120 and the second compressor 122 are a multi-stage compressor, a plurality of compression cylinders may compress the boil-off gas to the pressure required by the fuel consumption place 180 several times.

When the first compressor 120 and the second compressor 122 are a multi-stage compressor, the plurality of compression cylinders may be provided in the first compressor 120 and the second compressor 122 in series and the plurality of coolers may each be provide on the downstream of the plurality of compression cylinders.

The first cooler 130 of the present embodiment is installed on the downstream of the first compressor 120 to cool the boil-off gas which is compressed by the first compressor 120 and has the increased pressure and temperature. The second cooler 132 of the present embodiment is installed on the downstream of the second compressor 122 to cool the boil-off gas which is compressed by the second compressor 122 and has the increased pressure and temperature. The first cooler 130 and the second cooler 132 may cool the boil-off gas by exchanging heat with seawater, fresh water, or air introduced from the outside.

The second heat exchanger 140 of the present embodiment additionally cools the boil-off gas which is cooled by the first heat exchanger 110 and then supplied to the second heat exchanger 140 along the return line L3. The refrigerant decompressing device 160 of the present embodiment expands the boil-off gas which passes through the second heat exchanger 140 and then sends the expanded boil-off gas back to the second heat exchanger 140.

That is, the second heat exchanger 140 expands the boil-off gas, which passes through the first heat exchanger 110 and then supplied to the second heat exchanger 140 along the return line L3, performs heat exchange by the refrigerant to additionally cool the boil-off gas expanded by the refrigerant decompressing device 160.

The refrigerant decompressing device 160 of the present embodiment may be various means for lowering the pressure of the fluid, and the state of the fluid just before passing through the refrigerant decompressing device 160 and the state of the fluid just after passing through the refrigerant decompressing device 160 may be changed depending on the operation condition of the system. However, when the refrigerant decompressing device 160 is an expander, in order to prevent a physical damage of the refrigerant decompressing device 160, the fluid just before passing through the refrigerant decompressing device 160 and the fluid just after passing through the refrigerant decompressing device 160 are preferably maintained in a gas phase. Next, the above description is applied.

By the boil-off gas used as the refrigerant for the heat exchange in the second heat exchanger 140 after passing through the refrigerant decompressing device 160, after the boil-off gas compressed by the first compressor 120 is joined with the boil-off gas compressed by the second compressor 122, a part of the joined boil-off gas is supplied to the second heat exchanger 140 along the recirculation line L5 and cooled by exchanging heat with the boil-off gas, which passes through the refrigerant decompressing device 160, in the second heat exchanger 140 by the refrigerant and then supplied to the refrigerant decompressing device 160.

In addition, the boil-off gas supplied from the first supply line L1 to the second heat exchanger 140 along the first supply line L1 is primarily used in the second heat exchanger 140 and is additionally cooled by the refrigerant decompressing device 160 and is then sent back to the second heat exchanger 140, such that the boil-off gas is used as the refrigerant.

That is, the flow of the boil-off gas compressed by the first compressor 120 supplied to the second heat exchanger 140 along the recirculation line L5 after being joined with the boil-off gas compressed by the second compressor 122 and the boil-off gas which passes through the first heat exchanger 110 and is then supplied to the second heat exchanger 140 along the return line L3 exchange heat with each other by the boil-off gas, which passes through the refrigerant decompressing device 160, as a refrigerant to be cooled.

The first decompressing device 150 of the present embodiment is installed on the return line L3 to expand the boil-off gas cooled by the first heat exchanger 110 and the second heat exchanger 140. The boil-off gas compressed by the first compressor 120 is joined with the boil-off gas compressed by the second compressor 122 and then a part of the boil-off gas is branched into pass through the first heat exchanger 110, the second heat exchanger 110, and the first decompressing device 150 along the return line L3, such that the boil-off gas is partially or totally re-liquefied.

The first decompressing device 150 includes all means which may expand and cool the boil-off gas, and may be an expansion valve, such as a Joule-Thomson valve, or an expander.

The ship of the present embodiment may include the gas-liquid separator 170 which is installed on the return line L3 on the downstream of the first decompressing device 150 and separates the gas-liquid mixture discharged from the first decompressing device 150 into gas and liquid.

When the ship of the present embodiment does not include the gas-liquid separator 170, the liquid or the boil-off gas in the gas-liquid mixed state which passes through the first decompressing device 150 is immediately sent to the storage tank T.

When the ship of the present embodiment includes the gas-liquid separator 170, the boil-off gas which passes through the first decompressing device 150 is sent to the gas-liquid separator 170 to separate the gas phase and the liquid phase. The liquid separated by the gas-liquid separator 170 returns to the storage tank T along the return line L3 and the gas separated by the gas-liquid separator 170 is supplied to the first heat exchanger 110 along a gas discharge line L4 which extends from the gas-liquid separator 170 to the first supply line L1 on the upstream of the first heat exchanger 110.

When the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the first heat exchanger 110.

The first to eighth valves and the eleventh valve 191, 192, 193, 194, 195, 196, 197, 198, and 203 of the present embodiment may be manually controlled by allowing a person to directly determine the operation condition of the system and may be automatically controlled to be opened or closed depending on a preset value.

The main flow of the boil-off gas is defined to easily describe the operation of the device for re-liquefaction of boil-off gas according to an embodiment of the present invention. A flow in which the boil-off gas generated from the storage tank T and the gas discharged from the gas-liquid separator 170 is supplied to the first heat exchanger 110 is defined as a first flow 100, a flow which is supplied from the first heat exchanger 110 to the first compressor 120 or the second compressor 122 and then discharged from the first compressor 120 or the second compressor 122 and supplied to the fuel consumption place 180 is defined as a second flow 102, a flow which is branched from the second flow 102 on the downstream of the first compressor 120 and the second compressor 122 and the supplied to the second heat exchanger 140 is defined as a third flow 104, a flow which is branched from the second flow 102 on the downstream of the first compressor 120 and the second compressor 122 and supplied to the first heat exchanger 110 is defined as a fourth flow 106, and a flow which is supplied from the first heat exchanger 110 to the second heat exchanger 140 is defined as a fifth flow 108. The first flow 100 becomes the second flow 102 while passing through the first heat exchanger 110 and the fourth flow 106 becomes the fifth flow 108 while passing through the first heat exchanger 110.

Hereinafter, an operation of an apparatus for re-liquefaction of boil-off gas according to an embodiment of the present invention will be described with reference to FIG. 4.

The gaseous boil-off gas generated from the storage tank (T) storing the liquefied gas in the liquid phase is supplied to the first exchanger 110. At this time, the gaseous boil-off gas generated from the storage tank T meets the gaseous boil-off gas discharged from the gas-liquid separator 170 after the predetermined time elapses from the operation of the system to form the first flow 100. Ultimately, the boil-off gas supplied to the first heat exchanger 110 becomes the first flow 100.

The first heat exchanger 110 serves to recover the cold heat of the first flow 100 to cool the other boil-off gas. That is, the first heat exchanger 110 recovers the cold heat of the first flow 100 and delivers the recovered cold heat to the flow supplied back to the first heat exchanger 110 in the second flow 102, that is, the fourth flow 106.

Accordingly, in the first heat exchanger 110, the heat exchange is generated between the first flow 100 and the fourth flow 106 so that the first flow 100 is heated and the fourth flow 106 is cooled. The heated first flow 100 becomes the second flow 102 and the cooled fourth flow 106 becomes the fifth flow 108.

The second flow 102 discharged from the first heat exchanger 110 is supplied to the first compressor 120 or the second compressor 122 and is compressed by the first compressor 120 or the second compressor 122.

A part of the second flow 102 in which the boil-off gas compressed by the first compressor 120 and the boil-off gas compressed by the second compressor 122 are joined is the third flow 104 and supplied to the second heat exchanger 140 as a refrigerant, and the other part thereof is the fourth flow 106 and is supplied to the first heat exchanger 110 to be cooled and the remaining part thereof is supplied to the fuel consumption place 180.

The third flow 104 supplied to the second heat exchanger 140 is discharged from the second heat exchanger 140 and expanded in the refrigerant decompressing device 160 and then supplied back to the second heat exchanger 140. At this time, the third flow 104 primarily supplied to the second heat exchanger 140 is expanded in the refrigerant decompressing device 160 and then exchanges heat with the third flow 104 supplied back to the second heat exchanger 140 to be cooled. The third flow 104 which passes through the refrigerant decompressing device 160 and the second heat exchanger 140 is joined with the second flow 102 that is discharged from the first heat exchanger 110 and supplied to the first compressor 120 or the second compressor 122.

The fourth flow 106 cooled by the heat exchange with the first flow 100 in the first heat exchanger 110 becomes the fifth flow 108 and is supplied to the second heat exchanger 140. The fifth flow 108 supplied to the second heat exchanger 140 exchanges heat with the third flow 104 which passes through the refrigerant decompressing device 160 and is cooled, and then passes through the first decompressing device 150 and expanded. The fifth flow 108 which passes through the first decompressing device 150 becomes a gas-liquid mixture state in which gas and liquid are mixed.

The fifth flow 108 in the gas-liquid mixture state is immediately sent to the storage tank T or separated into gas and liquid while passing through the gas-liquid separator 170. The liquid separated by the gas-liquid separator 170 is supplied to the storage tank T and the gas separated by the gas-liquid separator 170 is supplied back to the first heat exchanger 110, thereby repeating the above-mentioned series of processes.

FIG. 5 is a configuration diagram schematically showing a boil-off gas treatment system for a ship according to a fourth embodiment of the present invention.

The ship of the fourth embodiment shown in FIG. 5 is different from the ship of the third embodiment shown in FIG. 4 in that the ship of the fourth embodiment further includes an additional compressor 124 and an additional cooler 134 which are installed on the second supply line L2 and a boost compressor 126 and a boost cooler 136 which are installed on the return line L3, and further includes a ninth valve 201, a tenth valve 202, a twelfth valve 205, and a first additional line L6, and is configured to operate the refrigerant cycle as the closed loop or operate the refrigerant cycle as the open loop by modifying some lines along which the boil-off gas flows. Hereinafter, the difference will be mostly described. The detailed description of the same member as the ship of the foregoing third embodiment will be omitted.

Referring to FIG. 5, similar to the third embodiment, the ship of the present embodiment includes the first heat exchanger 110, the first valve 191, the first compressor 120, the first cooler 130, the second valve 192, the third valve 193, the second compressor 122, the second cooler 132, the fourth valve 194, the second heat exchanger 140, the refrigerant decompressing device 160, and the first decompressing device 150.

Similar to the third embodiment, the storage tank T of the present embodiment stores liquefied gas such as liquefied natural gas and liquefied ethane gas, and discharges the boil-off gas to the outside when the internal pressure of the storage tank T exceeds a certain pressure or higher. The boil-off gas discharged from the storage tank (T) is sent to the first heat exchanger 110.

Similar to the third embodiment, the first heat exchanger 110 of the present embodiment uses the boil-off gas discharged from the storage tank T as the refrigerant and cools the boil-off gas sent to the first heat exchanger 110 along the return line L3. That is, the first heat exchanger 110 recovers the cold heat of the boil-off gas discharged from the storage tank T and supplies the recovered cold heat to the boil-off gas sent to the first heat exchanger 110 along the return line L3. The fifth valve 195 which controls the flow rate of the boil-off gas and opening/closing thereof may be installed on a return line L3.

Similar to the third embodiment, the first compressor 120 of the present embodiment is installed on the first supply line L1 to compress the boil-off gas discharged from the storage tank T and similar to the third embodiment, the second compressor 122 of the present embodiment is installed in parallel with the first compressor 120 on the second supply line L2 to compress the boil-off gas discharged from the storage tank T. The first compressor 120 and the second compressor 122 may be a compressor having the same performance, and each may be a multi-stage compressor.

Similar to the third embodiment, the first compressor 120 and the second compressor 122 of the present embodiment may compress the boil-off gas to the pressure required by the fuel consumption place 180. In addition, when the fuel consumption place 180 includes various kinds of engines, after the boil-off gas is compressed according to the required pressure of the engine requiring a higher pressure (hereinafter referred to as a 'high pressure engine'), a part of the boil-off gas is supplied to the high pressure engine and the other part thereof is supplied to the engine (hereinafter, referred to as 'low pressure engine') requiring a lower pressure. The boil-off gas may be decompressed by the decompressing device installed on the upstream and supplied to the low pressure engine. In addition, in order to increase the re-liquefaction efficiency and the re-liquefaction amount in the first heat exchanger 110 and the second heat exchanger 140, the first compressor 120 or the second compressor 122 compresses the boil-off gas to a high pressure equal to or higher than the pressure required by the fuel consumption place 180, and the decompressing device is installed on the upstream of the fuel consumption place 180 to lower the pressure of the boil-off gas compressed at the high pressure to the pressure required by the fuel consumption place 180 and then supply the decompressed boil-off gas to the fuel consumption place 180.

Similar to the third embodiment, the ship of the present embodiment may further include an eleventh valve 203 which is installed on the upstream of the fuel consumption place 180 to control a flow rate of the boil-off gas sent to the fuel consumption place 180 and opening/closing thereof.

Similar to the third embodiment, the ship of the present embodiment uses the boil-off gas compressed by the second compressor 122 as the refrigerant which additionally cools the boil-off gas in the second heat exchanger 140, thereby increasing the re-liquefaction efficiency and the re-liquefaction amount.

Similar to the third embodiment, the first cooler 130 of the present embodiment is installed on the downstream of the first compressor 120 to cool the boil-off gas that passes through the first compressor 120 and has the increased pressure and temperature. Similar to the third embodiment, the second cooler 132 of the present embodiment is installed on the downstream of the second compressor 122 to cool the boil-off gas which passes through the second compressor 122 and has the increased pressure and temperature.

Similar to the third embodiment, the second heat exchanger 140 of the present embodiment additionally cools the boil-off gas which is supplied to the first heat exchanger 110 along the return line L3 and cooled by the first heat exchanger 110.

Similar to the third embodiment, according to the present embodiment, the boil-off gas discharged from the storage tank T is further cooled not only in the first heat exchanger 110 but also in the second heat exchanger 140, and may be supplied to the first decompressing device 150 in the state in which the temperature is lower, thereby increasing the re-liquefaction efficiency and the re-liquefaction amount.

Similar to the third embodiment, the refrigerant decompressing device 160 of the present embodiment expands the boil-off gas which passes through the second heat exchanger 140, and then sends the expanded boil-off gas back to the second heat exchanger 140.

Similar to the third embodiment, the first decompressing device 150 of the present embodiment is installed on the return line L3 to expand the boil-off gas cooled by the first heat exchanger 110 and the second heat exchanger 140. The first decompressing device 150 of the present embodiment includes all means which may expand and cool the boil-off gas, and may be an expansion valve, such as a Joule-Thomson valve, or an expander.

Similar to the third embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the third embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the first heat exchanger 110 along a gas discharge line L4 which extends from the gas-liquid separator 170 to the first supply line L1 on the upstream of the first heat exchanger 110.

Similar to the third embodiment, when the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the first heat exchanger 110.

However, the ship of the present embodiment is different from the third embodiment in that the ship of the present embodiment further includes an additional compressor 124 which is installed on the second supply line L2; an additional cooler 134 which is installed on a downstream of the additional compressor 124; a boost compressor 126 which is installed on the return line L3; a boost cooler 136 which is installed on a downstream of the boost compressor 126; a first additional line L6 connecting between the recirculation line L5 and the second supply line L2; a ninth valve 201 which is installed on the recirculation line L5; a tenth valve 202 which is installed on the first additional line (L6); and a twelfth valve 205 which is installed on the recirculation line L5 between the second supply line L2 and the second heat exchanger 140.

Unlike the third embodiment which selectively includes the sixth valve, the ship of the present embodiment essentially includes the sixth valve 196 which is installed on the recirculation line L5 along which the boil-off gas branched from the first supply line L1 is sent to the second heat exchanger 140 to control the flow rate of the boil-off gas and the opening/closing thereof.

The additional compressor 124 of the present embodiment is installed on the upstream or the downstream of the second compressor 122 on the second supply line L2 and may have capacity smaller than that of the second compressor 122. The addition compressor 124 can be driven by the power generated from the refrigerant decompressing device 160 while the refrigerant decompressing device 160 expands the fluid, and the capacity of the additional compressor 124 may be capacity driven by power generated from the refrigerant decompressing device 160. Although the present embodiment describes, by way of example, the case where the additional compressor 124 uses the power generated from the refrigerant decompressing device 160 while the refrigerant decompression expands the fluid, the system may be configured so that the first compressor 120 or the second compressor 122 uses the power generated from the refrigerant decompressing device 160.

As a kind of compressors, there are a centrifugal compressor which compresses gas with energy by a centrifugal force generated by rotating an impeller at a high speed, a reciprocating compressor which compresses gas with a reciprocating motion of a piston within a cylinder, a screw compressor which compresses gas with an engagement of two rotors, or the like. Among those, the reciprocating compressor and the screw compressor belong to a positive displacement compressor which compresses gas sucked into a certain volume of the compressor.

The first compressor 120 and the second compressor 122 of the present embodiment are preferably the positive displacement compressors and the additional compressor 124 is preferably the centrifugal compressor. Here, when the additional compressor 124 is installed on the downstream of the second compressor 122, the second compressor 122 compresses the same flow rate as that of the first compressor 120, so the mass flow rate of the boil-off gas passing through the second supply line L2 is the same and the pressure only becomes high. However, when the additional compressor 124 is installed on the upstream of the second compressor 122, the boil-off gas which is compressed by the additional compressor 124 to have a high density is supplied to the second compressor 122, so the mass flow rate of the boil-off gas supplied to the second compressor 122 may be increased.

That is, if the additional compressor 124 is installed on the upstream of the second compressor 122, the boil-off gas which is discharged from the storage tank T and then supplied to the second supply line L2 is compressed by the additional compressor 124 to have a high density, so the mass of the boil-off gas supplied to the second compressor 122 becomes larger even if the boil-off gas having the same flow rate is supplied to the second compressor 122. As a result, since the mass of the fluid used as the refrigerant in the second heat exchanger 140 after being compressed by the second compressor 122 becomes larger, the re-liquefaction efficiency and the re-liquefaction amount in the second heat exchanger 140 may be increased. In the case where the additional compressor 124 is installed on the upstream of the second compressor 122, it is possible to operate the present embodiment as the closed loop and the independent open loop as well as to operate the present embodiment as the open loop by control the outlet pressure of the second compressor 122 to be equal to that of the first compressor 120.

In addition, if the additional compressor 124 is installed on the downstream of the second compressor 122, the mass flow rate is determined by the capacity of the second compressor 122, and the additional compressor 124 only serves to increase the additional pressure. Likewise, it can expect to improve the efficiency as compared to the existing compressor, but the efficiency is restrictively increased. Here, the additional compressor 124 is preferably installed on the upstream of the second compressor 122 If the additional compressor 124 is installed on the downstream of the second compressor 122, the present embodiment may be operated as the closed loop and the independent open loop, and the pressure of the boil-off gas passing through the first supply line L1 and the pressure of the boil-off gas passing through the second supply line L2 are different from each other, such that it may be difficult to operate the compressor as the open loop.

Similar effects can be achieved by increasing the pressure and capacity of the second compressor 122 instead of installing the additional compressor 124 in the embodiment. However, the use of the second compressor 122, which has a larger pressure and a larger capacity, results in an increase in cost.

According to the present embodiment, the power generated from the refrigerant decompressing device 160 may be utilized, and the additional compressor 124 may be added to increase the re-liquefaction efficiency and the re-liquefaction amount at a low cost.

The additional cooler 134 of the present embodiment lowers the temperature of the boil-off gas, which is compressed by the additional compressor 124 and has the increased temperature. If the additional compressor 124 is installed on the upstream of the second compressor 122, the additional compressor 124, the additional cooler 134, the second compressor 122, and the second cooler 132 are installed in this order, and when the additional compressor 124 is installed on the downstream of the second compressor 122, the second compressor 122, the second cooler 132, the additional compressor 124, and the additional cooler 134 are installed in this order.

The boost compressor 126 of the present embodiment is installed on the return line L3 on which a part of the boil-off gas supplied to the fuel consumption place 180 along the first supply line L1 is branched to be sent to the first heat exchanger 110, thereby increasing the pressure of the boil-off gas supplied to the first heat exchanger 110 along the return line L3. The boost compressor 126 may compress the boil-off gas to the pressure equal to or lower than a critical point (in the case of methane, approximately 55 bars) or a pressure exceeding the critical point, and the boost compressor 126 of the present embodiment may compress the boil-off gas to approximately 300 bars if the boil-off gas is compressed to a pressure equal to or higher than the critical point.

The boost cooler 136 of the present embodiment is installed on the return line L3 on the downstream of the boost compressor 126 to lower the temperature of the boil-off gas which passes through the boost compressor 126 and has not only the increased pressure but also the increased temperature.

The ship of the present embodiment further includes the boost compressor 126 to increase the pressure of the boil-off gas undergoing the re-liquefaction process, thereby increasing the re-liquefaction efficiency and the re-liquefaction amount.

FIGS. 9A and 9B are graphs showing temperature values of methane depending on a heat flow under different pressures. Referring to FIGS. 9A and 9B, it can be appreciated that the higher the pressure of the boil-off gas undergoing the re-liquefaction process, the higher the self-heat exchange efficiency becomes. The 'self-' of the self-heat exchange means the heat exchange with the high-temperature boil-off gas by the low-temperature boil-off gas itself as the cooling fluid.

FIG. 9A shows the state of each fluid in the second heat exchanger 140 when the boost compressor 126 and the boost cooler 136 are not included, and FIG. 9B shows the state of each fluid in the second heat exchanger 140 when the boost compressor 126 and the boost cooler 136 are included.

Graph I at the uppermost side in FIGS. 9A and 9B shows the fluid state at point A in FIG. 5 to which the second heat exchanger 140 is supplied along the recirculation line L5, graph L at the lowest side shows the fluid state of point C in FIG. 5 which is supplied back to the second heat exchanger 140 to be used as the refrigerant after passing through the second heat exchanger 140 and the refrigerant decompressing device 160 along the recirculation line L5, and graph J overlapping with graph K of an intermediate part shows the fluid state at point E in FIG. 5 which is supplied to the second heat exchanger 140 along the return line L3 after passing through the first heat exchanger 110.

Since the fluid used as the refrigerant is deprived of the cold heat during the heat exchange process and the temperature thereof is gradually increased, the graph L proceeds from the left to the right as time passes, and since the fluid cooled by the heat exchange with the refrigerant is supplied with the cold heat from the refrigerant during the heat exchange process and the temperature thereof is gradually reduced, the graphs I and J proceed from the right to the left as time passes.

The graph K at the intermediate part of FIGS. 9A and 9B is shown by a combination of the graph I and the graph J. That is, the fluid used as the refrigerant in the second heat exchanger 140 is drawn by the graph L, and the fluid cooled by the heat exchange with the refrigerant in the second heat exchanger 140 is drawn by the graph K.

The heat exchanger is designed so that the temperature and the heat flow of the fluid supplied (i.e., the points A, C, and E in FIG. 5) to the heat exchanger may be fixed, the temperature of the fluid used as the refrigerant may not be higher than the temperature of the fluid to be cooled (i.e., graphs L and K intersect each other so that the graph L does not show above the graph K), and a logarithmic mean temperature difference (LMTD) may be as small as possible.

The logarithmic mean temperature difference (LMTD) is a value represented by when in the case of a countercurrent flow which a heat exchanger manner in which the high-temperature fluid and the low-temperature fluid are injected in an opposite direction to each other and discharged from an opposite side from each other, the temperature before the low-temperature fluid passes through the heat exchanger is tc1, the temperature after the low-temperature fluid passes through the heat exchanger is tc2, the temperature before the high-temperature fluid passes through the heat exchanger is th1, the temperature after the high-temperature fluid passes through the heat exchanger is th2, and d1=th2−tc1 and d2=th1−tc2. The smaller the logarithmic mean temperature difference, the higher the efficiency of the heat exchanger.

On the graph, the logarithmic mean temperature difference (LMTD) is represented by an interval between the low-temperature fluid (graph L in FIG. 9) used as the refrigerant and the high-temperature fluid (graph K in FIG. 9) cooled by the heat exchange with the coolant. Here, it can be appreciated that the interval between the graph L and the graph K shown in FIG. 9B is narrower than the interval between the graph L and the graph K shown in FIG. 9A.

The difference appears because an initial value of the graph J, which is a point represented by a round circle, that is, the pressure of the fluid of the point E in FIG. 5 which passes through the first heat exchanger 110 and is then supplied to the second heat exchanger 140 along the return line L3 is higher in FIG. 9B than in FIG. 9A.

That is, as the simulation result, in the case of FIG. 9A which does not include the boost compressor 126, the fluid at the point E in FIG. 5 may be approximately −111° C. and 20 bars, and in the case of FIG. 9B which includes the boost compressor 126, the fluid at the point E in FIG. 5 may be approximately −90° C. and 50 bars. If the heat exchanger is designed so that the LMTD is smallest under the initial condition, in the case of FIG. 9B in which the pressure of the boil-off gas undergoing the re-liquefaction process is high, the efficiency of the heat exchanger is higher, such that the re-liquefaction amount and the re-liquefaction efficiency of the overall system are increased.

In the case of FIG. 9A, when the flow rate of the boil-off gas used as the refrigerant in the second heat exchanger 140 is approximately 6401 kg/h, a total of heat flow transferred to the fluid (graph K) which is cooled by the heat exchange with the refrigerant from the fluid (graph L) used as the refrigerant is 585.4 kW and the flow rate of the re-liquefied boil-off gas is approximately 3441 kg/h.

In the case of FIG. 9B, when the flow rate of the boil-off gas used as the refrigerant in the second heat exchanger 140 is approximately 5,368 kg/h, a total of heat flow transferred to the fluid (graph K) which is cooled by the heat exchange with the refrigerant from the fluid (graph L) used as the refrigerant is 545.2 kW and the flow rate of the re-liquefied boil-off gas is approximately 4,325 kg/h.

That is, it can be appreciated that if the pressure of the boil-off gas undergoing the re-liquefaction process, including the boost compressor 126 is increased, the larger amount of boil-off gas may be re-liquefied even if a smaller amount of refrigerant is used.

As described, since the ship of the present embodiment includes the boost compressor 126, it is possible to increase the re-liquefaction amount and the re-liquefaction efficiency, and since the case in which the boil-off gas can be completely treated without operating the second compressor 122 by increasing the re-liquefaction amount and the re-liquefaction efficiency is increased, the use frequency of the second compressor 122 can be reduced.

Although the re-liquefaction efficiency can be increased by using the second compressor 122, the longer the time to operate the second compressor 122, the weaker the redundancy concept for preparing for the failure of the first compressor 120. The ship of the present embodiment can reduce the use frequency of the second compressor 122 including the boost compressor 126, and therefore the redundancy concept can be sufficiently secured.

In addition, since the boost compressor 126 is generally sufficient to have approximately one half capacity of the first compressor 120 or the second compressor 122, the operation cost may be more saved in the case in which the system is operated by operating only the boost compressor 126 and the first compressor 120 without operating the second compressor 122 than in the case in which the system is operated only by the first compressor 120 and the second compressor 122 without the installation of the boost compressor 126.

Referring back to FIG. 5, one side of the first additional line L6 of the present embodiment is connected to a recirculation line L5 along which the boil-off gas is expanded by the refrigerant decompressing device 160 and then sent to the first supply line L1 through the second heat exchanger 140 and the other side thereof is connected to the second supply line L2 between the third valve 193 and the second compressor 122.

The ninth valve 201 of the present embodiment is installed on the recirculation line L5 between the point where the recirculation line L5 meets the first supply line L1 on the upstream of the first compressor 120 and the second compressor 122 and the point where the recirculation line L5 meets the first additional line L6. In addition, the ship of the present embodiment is different from the third embodiment in that the second supply line L2 on the downstream of the second compressor 122 is connected to the recirculation line L5 instead of the first supply line L1.

The twelfth valve 205 of the present embodiment is installed on the recirculation line L5 between the second supply line L2 and the second heat exchanger 140 to control the flow rate of the fluid and the opening and closing thereof.

The first to twelfth valves 191, 192, 193, 194, 195, 196, 197, 198, 201, 202, 203, and 205 of the present embodiment may be manually controlled by allowing a person to directly determine the operation condition of the system and may be automatically controlled to be opened or closed depending on a preset value.

The differentiated features of the ship of the present embodiment from of the ship of the third embodiment are that the refrigerant cycle may be operated not only as the open loop but also as the closed loop so as to more flexibly use the re-liquefaction system according to the operating conditions of the ship. Hereinafter, a method of operating a refrigerant cycle as the closed loop and a method of operating a refrigerant cycle as the open loop by a valve control when the additional compressor 124 is installed on the upstream of the second compressor 122 will be described.

To operate the refrigerant cycle of the ship of the present embodiment as the closed loop, the system is operated while the first valve 191, the second valve 192, the third valve 193, the fourth valve 194, the tenth valve 202, and the twelfth valve 205 are open, and the sixth valve 196 and the ninth valve 201 are closed.

If the boil-off gas which is discharged from the storage tank T and then compressed by the second compressor 122 is supplied to the recirculation line L5, the third valve 193 is closed to form the refrigerant cycle of the closed loop in which the boil-off gas circulates the additional compressor 124, the additional cooler 134, the second compressor 122, the second cooler 132, the fourth valve 194, the twelfth valve 205, the second heat exchanger 140, the refrigerant decomposition device 160, the second heat exchanger 140, and the tenth valve 202.

When the refrigerant cycle is configured as the closed loop, nitrogen gas may be used as the refrigerant circulating the closed loop. In this case, the storage tank of the present embodiment may further include a pipe through which nitrogen gas is introduced into the refrigerant cycle of the closed loop.

When the refrigerant cycle is operated as the closed loop, only the boil-off gas circulating the closed loop is used as the refrigerant in the second heat exchanger 140. The boil-off gas passing through the first compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the second heat exchanger 140 irrespective of the re-liquefaction amount or the amount of boil-off gas required by the fuel consumption place 180.

It is easy to control the flow rate of each of the boil-off gas undergoing the re-liquefaction process and the boil-off gas used as the refrigerant in the case where the refrigerant cycle of the present embodiment is operated as the closed loop, as compared with the case in which the refrigerant cycle is operated as the open loop or the independent open loop.

According to the present embodiment, since only one compressor 120 is installed on the first supply line L1 and two compressors 122 and 124 are installed on the second supply line L2, the pressure of the boil-off gas passing through the first supply line L1 and the pressure of the boil-off gas passing through the second supply line L2 may be different from each other. When the pressure of the boil-off passing through the first supply line L1 and the pressure of the boil-off passing through the second supply line L2 are different from each other, the refrigerant cycle of the present embodiment is preferably operated as the closed loop or the independent closed loop.

The flow of the boil-off gas in the case where the refrigerant cycle of the ship of the present embodiment is operated as the closed loop will be described as follows.

The boil-off gas discharged from the storage tank T passes through the first heat exchanger 110 and then compressed by the compressor 120, and a part thereof is cooled by the first cooler 130 and then sent to the fuel consumption place 180, and the remaining part thereof undergoes the re-liquefaction process along the return line L3.

The boil-off gas undergoing the re-liquefaction process along the return line L3 is cooled by exchanging heat with the boil-off gas which is compressed by the boost compressor 124, cooled by the boost cooler 136, and then discharged from the storage tank T by the first heat exchanger 110. The boil-off gas cooled by the first heat exchanger 110 is additionally cooled by the heat exchange in the second heat exchanger 140 and then expanded by the first decompressing device 150, such that the boil-off gas is partially or totally re-liquefied.

Although the present embodiment describes that the boil-off gas undergoing the re-liquefaction process along the return line L3 is compressed by the boost compressor 126 and is then cooled twice in the first heat exchanger 110 and the second heat exchanger 140, the boil-off gas compressed by the boost compressor 126 may be directly sent to the second heat exchanger 140 and then cooled and expanded by the first decompressing device 150 to be re-liquefied. The same is applied to the case where the refrigerant cycle of the present embodiment is operated as the open loop and the independent open loop.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the first heat exchanger 110. The liquid separated by the gas-liquid separator 170 is sent to the storage tank T.

On the other hand, after the boil-off gas circulating the refrigerant cycle is compressed by the additional compressor 124 and cooled by the additional cooler 134, the boil-off gas is additionally compressed by the second compressor 122 and further compressed by the second cooler 132, and sent to the second heat exchanger 140 along the recirculation line L5. The boil-off gas which passes through the additional compressor 126 and the second compressor 122 and then sent to the second heat exchanger 140 is primarily heat-exchanged in the second heat exchanger 140 to be cooled and then sent to the refrigerant decompressing device 160 to be secondarily expanded and cooled.

The present embodiment describes that the boil-off gas used as the refrigerant along the recirculation L5 primarily passes through the second heat exchanger 140 then sent back to the second heat exchanger 140 via the refrigerant decompressing device 160, the boil-off gas used as the refrigerant along the recirculation line L5 may be sent directly to the refrigerant decompressing device 160 without passing through the second heat exchanger 140 and then sent to the second heat exchanger 140. The same is applied to the case where the refrigerant cycle of the present embodiment is operated as the open loop and the independent open loop.

The boil-off gas which passes through the refrigerant decompressing device 160 is sent back to the second heat exchanger 140 to be used as a refrigerant which cools the boil-off gas passing through the first heat exchanger 110 and then supplied to the second heat exchanger 140 along the return line L3 and the boil-off gas compressed by the additional compressor 124 and the second compressor 122 and then supplied to the second heat exchanger 140 along the recirculation line L5. The boil-off gas which passes through the refrigerant decompressing device 160 and then used as the refrigerant in the second heat exchanger 140 is sent back to the additional compressor 124, thereby repeating the above-mentioned series of processes.

If the compressor 120 or the cooler 130 fails while the refrigerant cycle of the ship of the present embodiment is operated as the closed loop, the first valve 191, the second valve 192, the tenth valve 202, and the twelfth valve 205 are closed and the third valve 193 and the sixth valve 196 are open to allow the boil-off gas which is discharged from the storage tank T and then passes through the first heat exchanger 110 to be supplied to the fuel consumption place 180 via the third valve 193, the additional compressor 122, the additional cooler 132, the second compressor 122, the second cooler 132, the fourth valve 194, and the sixth valve 196. When it is necessary to use the boil-off gas compressed by the additional compressor 124 and the second compressor 122 as the refrigerant of the second heat exchanger 140, the ninth valve 201 and the twelfth valve 205 may open to operate the system.

To operate the refrigerant cycle of the ship of the present embodiment as the open loop, the first valve 191, the second valve 192, the third valve 193, the fourth valve 194, the sixth valve 196, the ninth valve 201, and the twelfth valve 205 are open, and the tenth valve 202 are closed.

When the refrigerant cycle is operated as the closed loop, the boil-off gas circulating the refrigerant cycle and the boil-off gas sent to the fuel consumption place 180 or undergoing the re-liquefaction process along the return line L3 are separated. On the other hand, when the refrigerant cycle is operated as the open loop, the boil-off gas compressed by the first compressor 120 and the boil-off gas compressed by the second compressor 122 are joined to be used as a refrigerant in the second heat exchanger 140, to be sent to the fuel consumption place 180, or to undergo the re-liquefaction process along the return line L3.

Therefore, if the refrigerant cycle is operated as the open loop, the flow rate of the refrigerant to be sent to the second heat exchanger 140 may be flexibly controlled in consideration of the re-liquefaction amount and the amount of boil-off gas required by the fuel consumption place 180. In particular, when the amount of boil-off gas required by the fuel consumption place 180 is small, increasing the flow rate of the refrigerant sent to the second heat exchanger 140 may increase the re-liquefaction efficiency and the re-liquefaction amount.

The flow of the boil-off gas in the case where the refrigerant cycle of the ship of the present embodiment is operated as the open loop will be described as follows.

The boil-off gas discharged from the storage tank T is branched into two flows after passing through the first heat exchanger 110 and a part thereof is sent to the first supply line L1 and the remaining part thereof is supplied to the second supply line L2.

The boil-off gas sent to the first supply line L1 passes through the first valve 191, the first compressor 120, the first cooler 130, and the second valve 192 and then a part thereof passes through the sixth valve 196 and the twelfth valve 205 and is sent to the second heat exchanger 140, and the other part thereof is again branched into two flows. One flow of the boil-off gases branched into the two flows is sent to the fuel consumption place 180 and the other thereof is sent to the boost compressor 126 along the return line L3.

The boil-off gas sent to the second supply line L1 passes through the third valve 193, the additional compressor 124, the additional cooler 132, the second compressor 122, the second cooler 132, and the fourth valve 194 and then a part thereof is sent to the second heat exchanger 140 via the twelfth valve 205 and the other part thereof is sent to the first supply line L1 and then branched into two flows. One flow of the boil-off gases branched into the two flows is sent to the fuel consumption place 180 and the other thereof is sent to the boost compressor 126 along the return line L3.

For convenience of explanation, the boil-off gas compressed by the first compressor 120 and the boil-off gas compressed by the additional compressor 124 and the second compressor 122 are separately described. However, each of the boil-off gas compressed by the first compressor 120 and the boil-off gas compressed by the additional compressor 124 and the second compressor 122 does not flow separately but is joined to be supplied to the second heat exchanger 140, the fuel consumption place 180, or the boost compressor 124.

That is, the boil-off gas compressed by the first compressor 120 and the boil-off gas compressed by the additional compressor 124 and the second compressor 122 are mixed, which in turn flows in the recirculation line L5 along which the boil-off gas is sent to the second heat exchanger 140, the first supply line L1 along which the boil-off gas is sent to the fuel consumption place 180, and the return line L3 along which the boil-off gas is sent to the first heat exchanger 110.

The boil-off gas sent to the second heat exchanger 140 along the recirculation line L5 is primarily heat-exchanged in the second heat exchanger 140 to be cooled, and secondarily expanded by the refrigerant decompressing device 160 to be cooled and supplied back to the second heat exchanger 140. The boil-off gas which passes through the refrigerant decompressing device 160 and then supplied to the second heat exchanger 140 exchanges heat with the boil-off gas which passes through the first heat exchanger 110 and then supplied to the second heat exchanger 140 along the return line L3 and a confluent flow of the boil-off gas which is supplied to the second heat exchanger 140 along the recirculation line L5 and compressed by the first compressor 120 and the boil-off gas compressed by the additional compressor 124 and the second compressor 122.

The boil-off gas used as the refrigerant in the second heat exchanger 140 after passing through the refrigerant decompressing device 160 is sent to the first supply line L1 via the ninth valve 201 to be discharged from the storage tank T and then joined with the boil-off gas passing through the first heat exchanger 110, thereby repeating the above-mentioned series of processes.

Meanwhile, the boil-off gas sent to the boost compressor 124 along the return line L3 is compressed by the boost compressor 124, cooled by the boost cooler 134, and then sent to the first heat exchanger 110. The boil-off gas sent to the first heat exchanger 110 is primarily cooled by the first heat exchanger 110, secondarily cooled by the second heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the first heat exchanger 110. The liquid separated by the gas-liquid separator 170 is supplied to the storage tank T.

If the first compressor 120 or the first cooler 130 fails while the refrigerant cycle of the ship of the present embodiment is operated as the open loop, the first valve 191, the second valve 192, the ninth valve 201, and the twelfth valve 205 are closed to allow the boil-off gas discharged from the storage tank T and then passing through the first heat exchanger 110 to be supplied to the fuel consumption place 180 via the third valve 193, the additional compressor 124, the additional cooler 134, the second compressor 122, the second cooler 132, the fourth valve 194, and the sixth valve 196. When it is necessary to use the boil-off gas compressed by the additional compressor 124 and the second compressor 122 as the refrigerant of the second heat exchanger 140, the ninth valve 201 and the twelfth valve 205 may open to operate the system.

The ship of the present embodiment may independently operate the second compressor 122 and the first compressor 120 while operating the refrigerant cycle as the open loop so that the boil-off gas compressed by the second compressor 122 is used only as the refrigerant of the second heat exchanger 140, the boil-off gas compressed by the first compressor 120 is sent to the fuel consumption place 180 or undergoes the re-liquefaction process along the return line L3 and is not used as the refrigerant of the second heat exchanger 140. Hereinafter, the refrigerant cycle of the open loop in which the second compressor 122 and the first compressor 120 are operated independently is referred to as an 'independent open loop'.

To operate the refrigerant cycle of the ship of the present embodiment as the independent open loop, the first valve 191, the second valve 192, the third valve 193, the fourth valve 194, the ninth valve 201, and the twelfth valve 205 are open, and the sixth valve 196 and the tenth valve 202 are closed. When the refrigerant cycle is operated as the independent open loop, it is possible to more flexibly operate the system than when the refrigerant cycle is operated as the closed loop, and to more easily operate the system than when the refrigerant cycle is operated as the open loop.

The flow of the boil-off gas in the case where the refrigerant cycle of the ship of the present embodiment is operated as the independent open loop will be described as follows.

The boil-off gas discharged from the storage tank T is branched into two flows after passing through the first heat exchanger 110 and a part thereof is sent to the first supply line L1 and the remaining part thereof is supplied to the second supply line L2. The boil-off gas sent to the first supply line L1 passes through the first valve 191, the first compressor 120, the first cooler 130, and the second valve 192 and then a part thereof is sent to the fuel consumption place 180 and the other part thereof is sent to the boost compressor 126 along the return line L3.

The boil-off gas sent to the second supply line L2 passes through the third valve 193, the additional compressor 124, the additional cooler 132, the second compressor 122, the second cooler 132, the fourth valve 194, and the twelfth valve 205 and is then sent to the second heat exchanger 140 along the recirculation line L5.

The boil-off gas which is compressed by the additional compressor 124 and the second compressor 122 and then sent to the second heat exchanger 140 along the recirculation line L5 is used as the refrigerant which cools the boil-off gas which is primarily heat-exchanged in the second heat exchanger 140 to be cooled, secondarily expanded by the refrigerant decompressing device 160 to be cooled, and then supplied back to the second heat exchanger 140 to pass through the first heat exchanger 110 and then be supplied to the second heat exchanger 140 via the return line L3 and the boil-off gas which is compressed by the additional compressor 124 and second compressor 122 and then supplied to the second heat exchanger 140 along the recirculation line L5.

The boil-off gas used as the refrigerant in the second heat exchanger 140 after passing through the refrigerant decompressing device 160 is sent to the first supply line L1 via the ninth valve 201 to be discharged from the storage tank T and then joined with the boil-off gas passing through the first heat exchanger 110, thereby repeating the above-mentioned series of processes.

The boil-off gas which is compressed by the first compressor 120 and then sent to the boost compressor 124 along the return line L3 is compressed by the boost compressor 124, cooled by the boost cooler 134, and then sent to the first heat exchanger 110. The boil-off gas sent to the first heat exchanger 110 is primarily cooled by the first heat exchanger 110, secondarily cooled by the second heat exchanger 140, and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the first heat exchanger 110. The liquid separated by the gas-liquid separator 170 is sent to the storage tank T.

If the first compressor 120 or the first cooler 130 fails while the refrigerant cycle of the ship of the present embodiment is operated as the independent open loop, the first valve 191, the second valve 192, the ninth valve 201, and the twelfth valve 205 are closed and the sixth valve 196 is open to allow the boil-off gas which is discharged from the storage tank T and then passes through the first heat exchanger 110 to be supplied to the fuel consumption place 180 via the third valve 193, the additional compressor 124, the additional cooler 134, the second compressor 122, the second cooler 132, the fourth valve 194, and the sixth valve 196. When it is necessary to use the boil-off gas compressed by the additional compressor 124 and the second compressor 122 as the refrigerant of the second heat exchanger 140, the ninth valve 201 and the twelfth valve 205 may open to operate the system.

FIG. 6 is a configuration diagram schematically showing a boil-off gas treatment system for a ship according to a fifth embodiment of the present invention.

The ship of the fifth embodiment shown in FIG. 6 is different from the ship of the fourth embodiment shown in FIG. 5 in that the first additional line L6 are not provided, the additional compressor 124 and the additional cooler 134 are installed on the recirculation line L5, and connection positions of the respective lines are slightly changed. Hereinafter, the difference will be mostly described. The detailed description of the same member as the ship of the foregoing fourth embodiment will be omitted.

Referring to FIG. 6, similar to the fourth embodiment, the ship of the present embodiment includes the first heat exchanger 110, the first valve 191, the first compressor 120, the first cooler 130, the second valve 192, the third valve 193, the second compressor 122, the second cooler 132, the fourth valve 194, the boost compressor 126, the boost cooler 136, the second heat exchanger 140, the refrigerant decompressing device 160, the additional compressor 124, the additional cooler 134, the ninth valve 201, the twelfth valve 205, and the first decompressing device 150.

Similar to the fourth embodiment, the first heat exchanger 110 of the present embodiment uses the boil-off gas discharged from the storage tank T as the refrigerant and cools the boil-off gas sent to the first heat exchanger 110 along the return line L3. That is, the first heat exchanger 110 recovers the cold heat of the boil-off gas discharged from the storage tank T and supplies the recovered cold heat to the boil-off gas sent to the first heat exchanger 110 along the return line L3. The fifth valve 195 which controls the flow rate of the boil-off gas and opening/closing thereof may be installed on a return line L3.

Similar to the fourth embodiment, the first compressor 120 of the present embodiment is installed on the first supply line L1 to compress the boil-off gas discharged from the storage tank T and similar to the fourth embodiment, the second compressor 122 of the present embodiment is installed in parallel with the first compressor 120 on the second supply line L2 to compress the boil-off gas discharged from the storage tank T. The first compressor 120 and the second compressor 122 may be a compressor having the same performance, and each may be a multi-stage compressor.

Similar to the fourth embodiment, the first compressor 120 and the second compressor 122 of the present embodiment may compress the boil-off gas to the pressure required by the fuel consumption place 180. In addition, when the fuel consumption place 180 includes various kinds of engines, after the boil-off gas is compressed according to the required pressure of the engine requiring a higher pressure (hereinafter referred to as a 'high pressure engine'), a part of the boil-off gas is supplied to the high pressure engine and the other part thereof is supplied to the engine (hereinafter, referred to as 'low pressure engine') requiring a lower pressure. The boil-off gas may be decompressed by the decompressing device installed on the upstream and supplied to the low pressure engine. In addition, in order to increase the re-liquefaction efficiency and the re-liquefaction amount in the first heat exchanger 110 and the second heat exchanger 140, the first compressor 120 or the second compressor 122 compresses the boil-off gas to a high pressure equal to or higher than the pressure required by the fuel consumption place 180, and the decompressing device is installed on the upstream of the fuel consumption place 180 to lower the pressure of the boil-off gas compressed at the high pressure to the pressure required by the fuel consumption place 180 and then supply the decompressed boil-off gas to the fuel consumption place 180.

Similar to the fourth embodiment, the ship of the present embodiment may further include an eleventh valve 203 which is installed on the upstream of the fuel consumption place 180 to control a flow rate of the boil-off gas sent to the fuel consumption place 180 and opening/closing thereof.

Similar to the fourth embodiment, the ship of the present embodiment uses the boil-off gas compressed by the second compressor 122 as the refrigerant which additionally cools the boil-off gas in the second heat exchanger 140, thereby increasing the re-liquefaction efficiency and the re-liquefaction amount.

Similar to the fourth embodiment, the first cooler 130 of the present embodiment is installed on the downstream of the first compressor 120 to cool the boil-off gas that passes through the first compressor 120 and has the increased pressure and temperature. Similar to the fourth embodiment, the second cooler 132 of the present embodiment is installed on the downstream of the second compressor 122 to cool the boil-off gas which passes through the second compressor 122 and has the increased pressure and temperature.

Similar to the fourth embodiment, the boost compressor 126 of the present embodiment is installed on the return line L3 on which a part of the boil-off gas supplied to the fuel consumption place 180 along the first supply line L1 is branched to be sent to the first heat exchanger 110, thereby increasing the pressure of the boil-off gas supplied to the first heat exchanger 110 along the return line L3. The boost compressor 126 may compress the boil-off gas to the pressure equal to or lower than a critical point (in the case of methane, approximately 55 bars) or a pressure exceeding the critical point, and the boost compressor 126 of the present embodiment may compress the boil-off gas to approximately 300 bars if the boil-off gas is compressed to a pressure equal to or higher than the critical point.

Similar to the fourth embodiment, the boost cooler 136 of the present embodiment is installed on the return line L3 on the downstream of the boost compressor 126 to lower the temperature of the boil-off gas which passes through the boost compressor 126 and has not only the increased pressure but also the increased temperature.

Since the ship of the present embodiment further includes the boost compressor 126, similar to the fourth embodiment, it is possible to increase the pressure of the boil-off gas undergoing the re-liquefaction process to increase the re-liquefaction amount and the re-liquefaction efficiency and decrease the use frequency of the second compressor 122, thereby sufficiently securing the redundancy concept and saving the operation cost as compared with the case where the boost compressor 126 is not installed.

Similar to the fourth embodiment, the second heat exchanger 140 of the present embodiment additionally cools the boil-off gas which is supplied to the first heat exchanger 110 along the return line L3 and cooled by the first heat exchanger 110.

Similar to the fourth embodiment, according to the present embodiment, the boil-off gas discharged from the storage tank T is further cooled not only in the first heat exchanger 110 but also in the second heat exchanger 140, and may be supplied to the first decompressing device 150 in the state in which the temperature is lower, thereby increasing the re-liquefaction efficiency and the re-liquefaction amount.

Similar to the fourth embodiment, the refrigerant decompressing device 160 of the present embodiment expands the boil-off gas which passes through the second heat exchanger 140, and then sends the expanded boil-off gas back to the second heat exchanger 140.

That is, the additional compressor 124 of the present embodiment compresses the fluid passing through the refrigerant decompressing device 160 and the second heat exchanger 140 and is driven by the power generated from expanding of the fluid by the refrigerant decompressing device 160. That is, the refrigerant decompressing device 160 and the additional compressor 124 of the present embodiment may form a compander 900. The additional compressor 124 may have a smaller capacity than the second compressor 122 and may be a capacity that may be driven by the power generated from the refrigerant decompressing device 160.

However, unlike the fourth embodiment, the additional compressor 124 of the present embodiment is not installed on the second supply line L2 but is installed on the recirculation line L5 which is branched from the second supply line L2 to allow the fluid passing through the refrigerant decompressing device 160 and the second heat exchange 140 to be sent back to the second supply line L2.

Similar to the fourth embodiment, according to the present embodiment, the power generated from the refrigerant decompressing device 160 may be utilized, and the additional compressor having a smaller capacity than the second compressor 122 is added, thereby increasing the re-liquefaction efficiency and the re-liquefaction amount at a low cost.

Similar to the fourth embodiment, the additional cooler 134 of the present embodiment is installed on the downstream of the additional compressor 124 to lower the pressure and temperature of the boil-off gas which is increased due to the compression of the additional compressor 124. However, unlike the fourth embodiment, the additional cooler 134 of the present embodiment is installed on the recirculation line L5.

In the present embodiment, the additional compressor 124 and the additional cooler 134 are installed on the recirculation line L5 to circulate the fluid used as the refrigerant in the second heat exchanger 140 along the same path as the closed loop refrigerant cycle of the fourth embodiment and supply as fuel the boil-off gas passing through the second compressor 122 and the second cooler 132 to the fuel consumption place 180 more easily than the fourth embodiment if the first compressor 120 or the first cooler 130 fails.

Hereinafter, the case where the first compressor 120 and the first cooler 130 is operated normally is referred to as 'normal', and the case where the first compressor 120 or the first cooler 130 fails is referred to as 'emergency'.

That is, according to the present embodiment, the fluid used as the refrigerant in the second heat exchanger 140 circulates the additional compressor 124, the additional cooler 134, the second compressor 122, the second cooler 132, the second heat exchanger 140, the refrigerant decompressing device 160, and the second heat exchanger 140, and then the additional compressor 124 along the recirculation line L5 and the second supply line L2, and therefore circulates the same refrigerant cycle as the closed loop refrigerant cycle of the fourth embodiment.

On the other hand, according to the fourth embodiment, the boil-off gas supplied to the fuel consumption place 180 along the second supply line L2 in an emergency is compressed by both the additional compressor 124 and the second compressor 122 and then supplied to the fuel consumption place 180, and therefore if the second compressor 122 has the same performance as the first compressor 120, the pressure of the boil-off gas supplied to the fuel consumption place 180 along the second supply line L2 in an emergency may be higher than that of the boil-off gas supplied to the fuel consumption place 180 along the first supply line L1 at normal times.

Therefore, according to the fourth embodiment, a separate control needs to be performed so that the pressure of the boil-off gas supplied to the fuel consumption place 180 along the second supply line L2 in an emergency is equal to the pressure of the boil-off gas supplied to the fuel consumption place 180 along the first supply line L1 at normal times, or the case where it is difficult to utilize the second compressor 122 as the redundancy may often occur.

On the other hand, according to the present embodiment, since the boil-off gas supplied to the fuel consumption place 180 along the second supply line L2 in an emergency is compressed only by the second compressor 122 without being compressed by the additional compressor 124 and then supplied to the fuel consumption place 180, if the second compressor 122 has the same performance as the first compressor 120, the boil-off gas may be easily supplied to the fuel consumption place 180 via the second supply line L2 without additionally adjusting the pressure in an emergency.

Similar to the fourth embodiment, the first decompressing device 150 of the present embodiment is installed on the return line L3 to expand the boil-off gas cooled by the first heat exchanger 110 and the second heat exchanger 140. The first decompressing device 150 of the present embodiment includes all means which may expand and cool the boil-off gas, and may be an expansion valve, such as a Joule-Thomson valve, or an expander.

Similar to the fourth embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the fourth embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the first heat exchanger 110 along a gas discharge line L4 which extends from the gas-liquid separator 170 to the first supply line L1 on the upstream of the first heat exchanger 110.

Similar to the fourth embodiment, when the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the first heat exchanger 110.

However, unlike the fourth embodiment, the ship of the present embodiment does not include the first additional line L6 and the second supply line L2 branched from the first supply line L1 is not joined with the recirculation line L5 but joined with the first supply line L1 again. In addition, after the recirculation line L5 is not branched from the first supply line L1 but is branched from the second supply line L2 between the second cooler 132 and the fourth valve 194, the recirculation line L5 is not joined with the first supply line L1 but joined with the second supply line L2 between the third valve 193 and the second compressor 122 again.

In addition, unlike the fourth embodiment, the ship of the present embodiment does not include the sixth valve 196.

Although the present embodiment describes the case where the ship includes the first heat exchanger 110 and thus the boil-off gas discharged from the storage tank T is heat-exchanged in the first heat exchanger 110 and then is supplied to the first compressor 120 or the second compressor 122, the ship of the present invention does not include the first heat exchanger 110 so that the boil-off gas discharged from the storage tank T is directly supplied to the first compressor 120 or the second compressor 122 and the boil-off gas undergoing the re-liquefaction process along the return line L3 is compressed by the boost compressor 126 and then sent to the second heat exchanger 140. The same goes for the sixth embodiment to be described below.

In addition, although the present embodiment describes the case where the fluid circulating along the recirculation line L5 primarily passes through the second heat exchanger 140, is expanded by the refrigerant decompressing device 160, and then supplied back to the second heat exchanger 140, the fluid circulated along the recirculation line L5 of the present invention may be branched from the second supply line L2 and then directly expanded by the refrigerant decompressing device 160 and then sent to the second heat exchanger 140. The same goes for the sixth embodiment to be described below The first to fifth valves, the seventh to ninth valves, the eleventh valve, and the twelfth valve 191, 192, 193, 194, 195, 196, 197, 198, 201, 203, and 205 of the present embodiment may be manually controlled by allowing a person to directly determine the operation condition of the system and may be automatically controlled to be opened or closed depending on a preset value.

The refrigerant cycle of the present embodiment is preferably operated as the closed loop. Hereinafter, a method of operating a refrigerant cycle as a closed loop according to the present embodiment by a valve control will be described.

To operate the refrigerant cycle of the ship of the present embodiment as the closed loop, the system is operated while the first valve 191, the second valve 192, the third valve 193, the fourth valve 194, the fifth valve 195, the ninth valve 201, and the twelfth valve 205 are open.

If the boil-off gas which is discharged from the storage tank T and then compressed by the second compressor 122 is supplied to the recirculation line L5, the third valve 193 and the fourth valve 194 are closed to form the refrigerant cycle of the closed loop in which the boil-off gas circulates the second compressor 122, the second cooler 132, the twelfth valve 205, the second heat exchanger 140, the refrigerant decompressing device 160, the second heat exchanger 140, the additional compressor 124, and the additional cooler 134, and the ninth valve 201.

When the refrigerant cycle is configured as the closed loop, nitrogen gas may be used as the refrigerant circulating the closed loop. In this case, the storage tank T of the present embodiment may further include a pipe through which nitrogen gas is introduced into the refrigerant cycle of the closed loop.

When the refrigerant cycle is operated as the closed loop, only the boil-off gas circulating the closed loop is used as the refrigerant in the second heat exchanger 140. The boil-off gas passing through the first compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the second heat exchanger 140 irrespective of the re-liquefaction amount or the amount of boil-off gas required by the fuel consumption place 180.

It is easy to control the flow rate of each of the boil-off gas undergoing the re-liquefaction process and the boil-off gas used as the refrigerant, compared with the case where the refrigerant cycle of the present embodiment is operated as the closed loop.

The flow of the boil-off gas in the case where the refrigerant cycle of the ship of the present embodiment is operated as the closed loop will be described as follows.

The boil-off gas discharged from the storage tank T passes through the first heat exchanger 110 and then compressed by the compressor 120, and a part thereof is cooled by the first cooler 130 and then sent to the fuel consumption place 180, and the remaining part thereof undergoes the re-liquefaction process along the return line L3.

The boil-off gas which passes through the first heat exchanger 110 after being discharged from the storage tank T may be approximately 1 bar and the approximately 1 bar of boil-off gas is compressed by the first compressor 120 to be approximately 17 bars. The pressure of the boil-off gas compressed by the first compressor 120 may be changed depending on the re-liquefaction performance and the operating conditions of the system required by the system.

The boil-off gas undergoing the re-liquefaction process along the return line L3 is cooled by exchanging heat with the boil-off gas which is compressed by the boost compressor 124, cooled by the boost cooler 136, and then discharged from the storage tank T by the first heat exchanger 110. The boil-off gas cooled by the first heat exchanger 110 is additionally cooled by the heat exchange in the second heat exchanger 140 and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the first heat exchanger 110. The liquid separated by the gas-liquid separator 170 is supplied to the storage tank T.

On the other hand, after the boil-off gas circulating the refrigerant cycle is compressed by the additional compressor 124 and cooled by the additional cooler 134, the boil-off gas is additionally compressed by the second compressor 122 and cooled by the second cooler 132, and sent to the second heat exchanger 140 along the recirculation L5. The boil-off gas which passes through the additional compressor 124 and the second compressor 122 and then sent to the second heat exchanger 140 is primarily heat-exchanged in the second heat exchanger 140 to be cooled and then sent to the refrigerant decompressing device 160 to be secondarily expanded and cooled.

The boil-off gas compressed by the additional compressor 124 may be approximately 2 bars and the boil-off gas of approximately 2 bars may be compressed by the second compressor 122 to be approximately 32 bars. The pressure of the boil-off gas compressed by the additional compressor 124 and the pressure of the boil-off gas compressed by the second compressor 122 may be changed depending on the re-liquefaction performance and the operating conditions required by the system.

The boil-off gas which passes through the refrigerant decompressing device 160 is sent back to the second heat exchanger 140 to be used as a refrigerant which cools the boil-off gas passing through the first heat exchanger 110 and then supplied to the second heat exchanger 140 along the return line L3 and the boil-off gas compressed by the additional compressor 124 and the second compressor 122 and then supplied to the second heat exchanger 140 along the recirculation line L5. The boil-off gas which passes through the refrigerant decompressing device 160 and then used as the refrigerant in the second heat exchanger 140 is sent back to the additional compressor 124, thereby repeating the above-mentioned series of processes.

If the first compressor 120 or the first cooler 130 fails while the refrigerant cycle of the ship of the present embodiment is operated as the closed loop, the first valve 191, the second valve 192, the ninth valve 201, and the twelfth valve 205 are closed and the third valve 193 and the fourth valve 196 are open to allow the boil-off gas which is discharged from the storage tank T and then passes through the first heat exchanger 110 to be supplied to the fuel consumption place 180 via the third valve 193, the second compressor 122, the second cooler 132, and the fourth valve 194.

FIG. 7 is a configuration diagram schematically showing a boil-off gas treatment system for a ship according to a sixth embodiment of the present invention.

The ship of the sixth embodiment shown in FIG. 7 is different from the ship of the fifth embodiment shown in FIG. 6 in that the ship includes a second additional line L11, a thirteen valve 206 which is installed on the second additional line L11, a third additional line L12, a fourteenth valve 207 which is installed on the third additional line L12, a fourth additional line L13, and a fifteenth valve 208 which is installed on the fourth additional line L13. Hereinafter, the difference will be mostly described. The detailed description of the same member as the ship of the foregoing fifth embodiment will be omitted.

Referring to FIG. 7, similar to the fifth embodiment, the ship of the present embodiment includes the first heat exchanger 110, the first valve 191, the first compressor 120, the first cooler 130, the second valve 192, the third valve 193, the second compressor 122, the second cooler 132, the fourth valve 194, the boost compressor 126, the boost cooler 136, the second heat exchanger 140, the refrigerant decompressing device 160, the additional compressor 124, the additional cooler 134, the ninth valve 201, the twelfth valve 205, and the first decompressing device 150.

Similar to the fifth embodiment, the first heat exchanger 110 of the present embodiment uses the boil-off gas discharged from the storage tank T as the refrigerant and cools the boil-off gas sent to the first heat exchanger 110 along the return line L3. That is, the first heat exchanger 110 recovers the cold heat of the boil-off gas discharged from the storage tank T and supplies the recovered cold heat to the boil-off gas sent to the first heat exchanger 110 along the return line L3. The fifth valve 195 which controls the flow rate of the boil-off gas and opening/closing thereof may be installed on a return line L3.

Similar to the fifth embodiment, the first compressor 120 of the present embodiment is installed on the first supply line L1 to compress the boil-off gas discharged from the storage tank T and similar to the fifth embodiment, the second compressor 122 of the present embodiment is installed in parallel with the first compressor 120 on the second supply line L2 to compress the boil-off gas discharged from the storage tank T. The first compressor 120 and the second compressor 122 may be a compressor having the same performance, and each may be a multi-stage compressor.

Similar to the fifth embodiment, the first compressor 120 and the second compressor 122 of the present embodiment may compress the boil-off gas to the pressure required by the fuel consumption place 180. In addition, when the fuel consumption place 180 includes various kinds of engines, after the boil-off gas is compressed according to the required pressure of the engine requiring a higher pressure (hereinafter referred to as a 'high pressure engine'), a part of the boil-off gas is supplied to the high pressure engine and the other part thereof is supplied to the engine (hereinafter, referred to as 'low pressure engine') requiring a lower pressure. The boil-off gas may be decompressed by the decompressing device installed on the upstream and supplied to the low pressure engine. In addition, in order to increase the re-liquefaction efficiency and the re-liquefaction amount in the first heat exchanger 110 and the second heat exchanger 140, the first compressor 120 or the second compressor 122 compresses the boil-off gas to a high pressure equal to or higher than the pressure required by the fuel consumption place 180, and the decompressing device is installed on the upstream of the fuel consumption place 180 to lower the pressure of the boil-off gas compressed at the high pressure to the pressure required by the fuel consumption place 180 and then supply the decompressed boil-off gas to the fuel consumption place 180.

Similar to the fifth embodiment, the ship of the present embodiment may further include an eleventh valve 203 which is installed on the upstream of the fuel consumption place 180 to control a flow rate of the boil-off gas sent to the fuel consumption place 180 and opening/closing thereof.

Similar to the fifth embodiment, the first cooler 130 of the present embodiment is installed on the downstream of the first compressor 120 to cool the boil-off gas that passes through the first compressor 120 and has the increased pressure and temperature. Similar to the fifth embodiment, the second cooler 132 of the present embodiment is installed on the downstream of the second compressor 122 to cool the boil-off gas which passes through the second compressor 122 and has the increased pressure and temperature.

Similar to the fifth embodiment, the boost compressor 126 of the present embodiment is installed on the return line L3 to increase the pressure of the boil-off gas supplied to the first heat exchanger 110 along the return line L3 The boost compressor 126 may compress the boil-off gas to the pressure equal to or lower than a critical point (in the case of methane, approximately 55 bars) or a pressure exceeding the critical point, and the boost compressor 126 of the present embodiment may compress the boil-off gas to approximately 300 bars if the boil-off gas is compressed to a pressure equal to or higher than the critical point.

Similar to the fifth embodiment, the boost cooler 136 of the present embodiment is installed on the return line L3 on the downstream of the boost compressor 126 to lower the temperature of the boil-off gas which passes through the boost compressor 126 and has not only the increased pressure but also the increased temperature.

Similar to the fifth embodiment, the ship of the present embodiment further includes the boost compressor 126 to increase the pressure of the boil-off gas which undergoes the re-liquefaction process, thereby increasing the re-liquefaction amount and the re-liquefaction efficiency, sufficiently securing the redundancy concept, and saving the operating cost.

Similar to the fifth embodiment, the second heat exchanger 140 of the present embodiment additionally cools the boil-off gas which is supplied to the first heat exchanger 110 along the return line L3 and cooled by the first heat exchanger 110.

Similar to the fifth embodiment, according to the present embodiment, the boil-off gas discharged from the storage tank T is further cooled not only in the first heat exchanger 110 but also in the second heat exchanger 140, and may be supplied to the first decompressing device 150 in the state in which the temperature is lower, thereby increasing the re-liquefaction efficiency and the re-liquefaction amount.

Similar to the fifth embodiment, the refrigerant decompressing device 160 of the present embodiment expands the boil-off gas which passes through the second heat exchanger 140, and then sends the expanded boil-off gas back to the second heat exchanger 140.

Similar to the fifth embodiment, the additional compressor 124 of the present embodiment is installed on the recirculation line L5 to compress the fluid that passes through the refrigerant decompressing device 160 and the second heat exchanger 140. In addition, similar to the fifth embodiment, the additional compressor 124 of the present embodiment is driven by the power generated by expanding of a fluid by the refrigerant decompressing device 160, and the refrigerant decompressing device 160 and the additional compressor 124 may configure the compander 900. The additional compressor 124 may have a smaller capacity than the second compressor 122 and may be a capacity that may be driven by the power generated from the refrigerant decompressing device 160.

Similar to the fifth embodiment, according to the present embodiment, the power generated from the refrigerant decompressing device 160 may be utilized, and the additional compressor 124 having a smaller capacity than the first compressor 120 or the second compressor 122 is added, thereby increasing the re-liquefaction efficiency and the re-liquefaction amount at a low cost.

Similar to the fifth embodiment, the additional cooler 134 of the present embodiment is installed on the downstream of the additional compressor 124 on the recirculation line L5 to lower the pressure and temperature of the boil-off gas which is increased due to the compression of the additional compressor 124.

In the present embodiment, similar to the fifth embodiment, the additional compressor 124 and the additional cooler 134 are installed on the recirculation line L5 to circulate the fluid used as the refrigerant in the second heat exchanger 140 along the same path as the closed loop refrigerant cycle of the fourth embodiment and supply as fuel the boil-off gas passing through the second compressor 122 and the second cooler 132 to the fuel consumption place 180 more easily than the fourth embodiment if the first compressor 120 or the first cooler 130 fails. In addition, as described below, if the second compressor 122 or the second cooler 132 fails while the system is operated to supply the boil-off gas compressed by the second compressor 122 to the fuel consumption place 180, it is possible to supply as fuel the boil-off gas, which passes through the first compressor 120 and the first cooler 130, to the fuel consumption place 180 more easily than the fourth embodiment.

Similar to the fifth embodiment, the first decompressing device 150 of the present embodiment is installed on the return line L3 to expand the boil-off gas cooled by the first heat exchanger 110 and the second heat exchanger 140. The first decompressing device 150 of the present embodiment includes all means which may expand and cool the boil-off gas, and may be an expansion valve, such as a Joule-Thomson valve, or an expander.

Similar to the fifth embodiment, the ship of the present embodiment may include the gas-liquid separator 170 which is installed on the return line L3 on the downstream of the first decompressing device 150 and separates the gas-liquid mixture discharged from the first decompressing device 150 into gas and liquid.

Similar to the fifth embodiment, when the ship of the present embodiment does not include the gas-liquid separator 170, the liquid or the boil-off gas in the gas-liquid mixed state which passes through the first decompressing device 150 is directly sent to the storage tank T, and when the ship of the present embodiment includes the gas-liquid separator 170, the boil-off gas which passes through the first decompressing device 150 is sent to the gas-liquid separator 170 to be separated into the gas phase and the liquid phase. The liquid separated by the gas-liquid separator 170 returns to the storage tank T along the return line L3 and the gas separated by the gas-liquid separator 170 is supplied to the first heat exchanger 110 along a gas discharge line L4 which extends from the gas-liquid separator 170 to the first supply line L1 on the upstream of the first heat exchanger 110.

Similar to the fifth embodiment, when the ship of the present embodiment includes the gas-liquid separator 170, the ship may further include a seventh valve 197 which controls the flow rate of the liquid separated by the gas-liquid separator 170 and sent to the storage tank T; and an eighth valve 198 which controls the flow rate of gas separated by the gas-liquid separator 170 and sent to the first heat exchanger 110.

In addition, similar to the fifth embodiment, the ship of the present embodiment does not include the first additional line L6, and the second supply line L2 branched from the first supply line L1 is again joined with the first supply line L1 and the recirculation line L5 is branched from the second supply line L2 between the second cooler 132 and the fourth valve 194 and then again joined with the second supply line L2 between the third valve 193 and the second compressor 122.

However, unlike the fifth embodiment, the ship of the present embodiment has the second additional line L11; the thirteenth valve 206 installed on the second additional line L11; the third additional line L12; the fourteenth valve 207 installed on the third additional line L12; a fourth additional line L13; and the fifteenth valve 208 installed on the fourth additional line L13.

The second additional line L11 of the present embodiment is branched from the recirculation line L5 between the additional cooler 134 and the ninth valve 201 and is branched from the first supply line L1 between the first valve 191 and the first compressor 120.

The third additional line L12 of the present embodiment is branched from the first supply line L1 between the first cooler 130 and the second valve 192 to be joined with the recirculation line L5 between the twelfth valve 205 and the second heat exchanger 140.

The fourth additional line L13 of the present embodiment is branched from the second supply line L2 between the second cooler 132 and the fourth valve 194 to be joined with the return line L3 between the fifth valve 195 and the boost compressor 126.

According to the present embodiment, unlike the fifth embodiment, both the first compressor 120 and the second compressor 122 are selectively used to compress the boil-off gas supplied to the refrigerant cycle; or to compress the boil-off gas supplied to the fuel consumption place 180. In addition, according to the present embodiment, unlike the fifth embodiment, not only the boil-off gas branched from the first supply line L1 but also the boil-off gas branched from the second supply line L2 may selectively undergo the re-liquefaction process along the return line L3.

That is, according to the fifth embodiment, at normal times, the boil-off gas compressed by the first compressor 120 is sent to the fuel consumption place 180 or undergoes the re-liquefaction process along the return line L3, and the boil-off gas compressed by the second compressor 122 circulates the refrigerant cycle and the usage of the first compressor 120 and the second compressor 122 may not be used interchangeably.

On the other hand, according to the present embodiment, any one of the first compressor 120 and the second compressor 122 is selected to supply the boil-off gas to the fuel consumption place 180 or the return line L3 to enable the other compressor, which does not supply the boil-off gas to the fuel consumption place 180, to circulate the compressed boil-off gas through the refrigerant cycle. Therefore, according to the present embodiment, there is an advantage that the system can be operated more freely than the fifth embodiment.

The first to fifth valves, the seventh to ninth valves, and the eleventh valve to the fifteenth valve 191, 192, 193, 194, 195, 196, 197, 198, 201, 203, 205, 206, 207, and 208 of the present embodiment may be manually controlled by allowing a person to directly determine the operating conditions of the system and may be automatically controlled to be opened or closed depending on a preset value.

The refrigerant cycle of the present embodiment is preferably operated as the closed loop. Hereinafter, a method of operating a refrigerant cycle as a closed loop according to the present embodiment by a valve control will be described.

To operate the refrigerant cycle of the ship of the present embodiment as the closed loop, send the boil-off gas compressed by the first compressor 120 to the fuel consumption place 180, and circulate the boil-off gas compressed by the second compressor 122 through the refrigerant cycle, the system is operated while the first valve 191, the second valve 192, the third valve 193, the fourth valve 194, the fifth valve 195, the ninth valve 201, and the twelfth valve 205 are open and the thirteenth valve 206, the fourteenth valve 207, and the fifteenth valve 208 is closed.

If the boil-off gas which is discharged from the storage tank T and then compressed by the second compressor 122 is supplied to the recirculation line L5, the third valve 193 and the fourth valve 194 are closed to form the refrigerant cycle of the closed loop in which the boil-off gas circulates the second compressor 122, the second cooler 132, the twelfth valve 205, the second heat exchanger 140, the refrigerant decompressing device 160, the second heat exchanger 140, the additional compressor 124, the additional cooler 134, and the ninth valve 201.

When the refrigerant cycle is configured as the closed loop, nitrogen gas may be used as the refrigerant circulating the closed loop. In this case, the storage tank T of the present embodiment may further include a pipe through which nitrogen gas is introduced into the refrigerant cycle of the closed loop.

When the refrigerant cycle is operated as the closed loop, only the boil-off gas circulating the closed loop is used as the refrigerant in the second heat exchanger 140. The boil-off gas passing through the first compressor 120 is not introduced into the refrigerant cycle but is supplied to the fuel consumption place 180 or undergoes the re-liquefaction process along the return line L3. Therefore, a predetermined flow rate of boil-off gas is circulated as the refrigerant in the second heat exchanger 140 irrespective of the re-liquefaction amount or the amount of boil-off gas required by the fuel consumption place 180.

It is easy to control the flow rate of each of the boil-off gas undergoing the re-liquefaction process and the boil-off gas used as the refrigerant in the case where the refrigerant cycle of the present embodiment is operated as the closed loop as compared with the case in which the refrigerant cycle is operated as the open loop or the independent open loop.

The flow of the boil-off gas when the refrigerant cycle of the ship of the present embodiment is operated as the closed loop, the boil-off gas compressed by the first compressor 120 is sent to the fuel consumption place 180, and the boil-off gas compressed by the second compressor 122 circulates the refrigerant cycle will be described below.

The boil-off gas discharged from the storage tank T passes through the first heat exchanger 110 and then compressed by the first compressor 120, and a part thereof is cooled by the first cooler 130 and then sent to the fuel consumption place 180, and the remaining part thereof undergoes the re-liquefaction process along the return line L3.

The boil-off gas which passes through the first heat exchanger 110 after being discharged from the storage tank T may be approximately 1 bar and the approximately 1 bar of boil-off gas is compressed by the first compressor 120 to be approximately 17 bars. The pressure of the boil-off gas compressed by the first compressor 120 may be changed depending on the re-liquefaction performance and the operating conditions required by the system.

The boil-off gas undergoing the re-liquefaction process along the return line L3 is cooled by exchanging heat with the boil-off gas which is compressed by the boost compressor 124, cooled by the boost cooler 136, and then discharged from the storage tank T by the first heat exchanger 110. The boil-off gas cooled by the first heat exchanger 110 is additionally cooled by the heat exchange in the second heat exchanger 140 and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the first heat exchanger 110. The liquid separated by the gas-liquid separator 170 is supplied to the storage tank T.

On the other hand, after the boil-off gas circulating the refrigerant cycle is compressed by the additional compressor 124 and cooled by the additional cooler 134, the boil-off gas is additionally compressed by the second compressor 122 and cooed by the second cooler 132, and sent to the second heat exchanger 140 along the recirculation L5. The boil-off gas which passes through the additional compressor 126 and the second compressor 122 and then sent to the second heat exchanger 140 is primarily heat-exchanged in the second heat exchanger 140 to be cooled and then sent to the refrigerant decompressing device 160 to be secondarily expanded and cooled.

The boil-off gas compressed by the additional compressor 124 may be approximately 2 bars and the boil-off gas of approximately 2 bars may be compressed by the second compressor 122 to be approximately 32 bars. The pressure of the boil-off gas compressed by the additional compressor 124 and the pressure of the boil-off gas compressed by the second compressor 122 may be changed depending on the re-liquefaction performance and the operating conditions required by the system.

The boil-off gas which passes through the refrigerant decompressing device 160 is sent back to the second heat exchanger 140 to be used as a refrigerant which cools the boil-off gas passing through the first heat exchanger 110 and then supplied to the second heat exchanger 140 along the return line L3 and the boil-off gas compressed by the additional compressor 124 and the second compressor 122 and then supplied to the second heat exchanger 140 along the recirculation line L5. The boil-off gas which passes through the refrigerant decompressing device 160 and then used as the refrigerant in the second heat exchanger 140 is sent back to the additional compressor 124, thereby repeating the above-mentioned series of processes.

If the first compressor 120 or the first cooler 130 fails while the refrigerant cycle of the ship of the present embodiment is operated as the closed loop, the boil-off gas compressed by the first compressor 120 is sent to the fuel consumption place 180, and boil-off gas compressed by the second compressor 122 circulates the refrigerant cycle, the first valve 191, the second valve 192, the fifth valve 195, the ninth valve 201, and the twelfth valve 205 are closed and the third valve 193 and the fourth valve 196 are open to allow the boil-off gas which is discharged from the storage tank T and then passes through the first heat exchanger 110 to be supplied to the fuel consumption place 180 via the third valve 193, the second compressor 122, the second cooler 132, and the fourth valve 194.

To operate the refrigerant cycle of the ship of the present embodiment as the closed loop, send the boil-off gas compressed by the second compressor 122 to the fuel consumption place 180, and circulate the boil-off gas compressed by the first compressor 120 through the refrigerant cycle, the system is operated while the first valve 191, the second valve 192, the third valve 193, the fourth valve 194, the thirteenth valve 206, the fourteenth valve 207, and the fifteenth valve 208 are open and the fifth valve 195, the ninth valve 201, and the twelfth valve 207 is closed.

If the boil-off gas which is discharged from the storage tank T and then compressed by the second compressor 120 is supplied to the recirculation line L5 along the third additional line L12, the first valve 191 and the second valve 192 are closed to form the refrigerant cycle of the closed loop in which the boil-off gas circulates the first compressor 120, the first cooler 130, the twelfth valve 207, the second heat exchanger 140, the refrigerant decompressing device 160, the second heat exchanger 140, the additional compressor 124, the additional cooler 134, and the ninth valve 206.

The flow of the boil-off gas when the refrigerant cycle of the ship of the present embodiment is operated as the closed loop, the boil-off gas compressed by the second compressor 122 is sent to the fuel consumption place 180, and the boil-off gas compressed by the first compressor 122 circulates the refrigerant cycle will be described below.

The boil-off gas discharged from the storage tank T passes through the first heat exchanger 110 and then compressed by the compressor 122, and a part thereof is cooled by the second cooler 132 and then sent to the fuel consumption place 180, and the remaining part thereof undergoes the re-liquefaction process along the return line L3 via the fifteenth valve 208.

The boil-off gas which passes through the first heat exchanger 110 after being discharged from the storage tank T may be approximately 1 bar and the approximately 1 bar of boil-off gas is compressed by the second compressor 122 to be approximately 17 bars. The pressure of the boil-off gas compressed by the second compressor 122 may be changed depending on the re-liquefaction performance and the operating conditions required by the system.

The boil-off gas undergoing the re-liquefaction process along the return line L3 is cooled by exchanging heat with the boil-off gas which is compressed by the boost compressor 124, cooled by the boost cooler 136, and then discharged from the storage tank T by the first heat exchanger 110. The boil-off gas cooled by the first heat exchanger 110 is additionally cooled by the heat exchange in the second heat exchanger 140 and then expanded by the first decompressing device 150, such that the boil-off gas is partially or totally re-liquefied.

When the ship of the present embodiment does not include the gas-liquid separator 170, the boil-off gas partially or totally re-liquefied is directly sent to the storage tank T. When the ship of the present embodiment includes the gas-liquid separator 170, the boil-off gas partially or totally re-liquefied is sent to the gas-liquid separator 170. The gas separated by the gas-liquid separator 170 is joined with the boil-off gas discharged from the storage tank T and sent to the first heat exchanger 110. The liquid separated by the gas-liquid separator 170 is supplied to the storage tank T.

On the other hand, after the boil-off gas circulating the refrigerant cycle is compressed by the additional compressor 124 and cooled by the additional cooler 134, the boil-off gas is additionally compressed by the first compressor 120 and cooled by the first cooler 130, and sent to the second heat exchanger 140 along the recirculation line L5 via the fourteenth valve 207. The boil-off gas which passes through the additional compressor 126 and the first compressor 120 and then sent to the second heat exchanger 140 is primarily heat-exchanged in the second heat exchanger 140 to be cooled and then sent to the refrigerant decompressing device 160 to be secondarily expanded and cooled.

The boil-off gas compressed by the additional compressor 124 may be approximately 2 bars and the boil-off gas of approximately 2 bars may be compressed by the first compressor 120 to be approximately 32 bars. The pressure of the boil-off gas compressed by the additional compressor 124 and the pressure of the boil-off gas compressed by the first compressor 120 may be changed depending on the re-liquefaction performance and the operating conditions required by the system.

The boil-off gas which passes through the refrigerant decompressing device 160 is sent back to the second heat exchanger 140 to be used as a refrigerant which cools the boil-off gas passing through the first heat exchanger 110 and then supplied to the second heat exchanger 140 along the return line L3 and the boil-off gas compressed by the additional compressor 124 and the first compressor 120 and then supplied to the second heat exchanger 140 along the recirculation line L5. The boil-off gas which passes through the refrigerant decompressing device 160 and then used as the refrigerant in the second heat exchanger 140 is sent back to the additional compressor 124, thereby repeating the above-mentioned series of processes.

If the second compressor 122 or the second cooler 132 fails while the refrigerant cycle of the ship of the present embodiment is operated as the closed loop, the boil-off gas compressed by the second compressor 120 is sent to the fuel consumption place 180, and boil-off gas compressed by the first compressor 120 circulates the refrigerant cycle, the third valve 193, the fourth valve 194, the thirteenth valve 206, the fourteenth valve 207, and the fifteenth valve 208 are closed and the first valve 191 and the second valve 206 are open to allow the boil-off gas which is discharged from the storage tank T and then passes through the first heat exchanger 110 to be supplied to the fuel consumption place 180 via the first valve 191, the first compressor 120, the first cooler 130, and the second valve 192.

The present invention is not limited to the above exemplary embodiments and therefore it is apparent to a person with ordinary skill in the art to which the present invention pertains that the exemplary embodiments of the present invention may be variously modified or changed without departing from the technical subjects of the present invention.

The invention claimed is:

1. A ship comprising:
a storage tank configured to store liquefied gas;
a boil-off gas discharge line configured to discharge boil-off gas from the storage tank;
at least one compressor comprising a first compressor and a second compressor, each configured to compress at least a portion of the boil-off gas discharged from the storage tank to provide compressed boil-off gas;
a third compressor configured to compress a first flow out of the compressed boil-off gas from the at least one compressor;
a first heat exchanger configured to heat-exchange the first flow flowing downstream the third compressor with the boil-off gas flowing through the boil-off gas discharge line upstream the at least one compressor, which cools the first flow;
a refrigerant decompressing device configured to expand a second flow of compressed boil-off gas flowing out of the at least one compressor;
a second heat exchanger configured to heat-exchange the second flow flowing downstream the refrigerant decompressing device with the first flow flowing downstream the first heat exchanger, which further cools the first flow;
liquefaction decompressing device configured to expand the first flow downstream the second heat exchanger, in which at least part of the first flow liquefies; and
a fourth compressor configured to compress the second flow downstream the second heat exchanger for returning to the at least one compressor,
wherein the fourth compressor is driven by power generated from expanding of the second flow at the refrigerant decompressing device.

2. The ship of claim 1, wherein the third compressor is configured to compress only the boil-off gas compressed by the first compressor and the refrigerant decompressing device is configured to expand only the boil-off gas compressed by the second compressor.

3. The ship of claim 1, wherein the second heat exchanger is configured to receive the second flow from the at least one compressor upstream the refrigerant decompressing device.

4. The ship of claim 1, further comprising a gas-liquid separator configured to separate liquefied gas from the first flow flowing downstream the liquefaction decompressing device for returning to the storage tank.

5. The ship of claim 1, further comprising a fuel consumption device configured to consume a portion of the compressed boil-off gas from the at least one compressor.

6. The ship of claim 1, wherein the fourth compressor, the second compressor, the refrigerant decompressing device, and the second heat exchanger form a closed-loop refrigerant cycle.

7. A ship comprising:
a storage tank configured to store liquefied gas;
a boil-off gas discharge line configured to discharge boil-off gas from the storage tank;
at least one compressor comprising a first compressor and a second compressor, each configured to compress at least a portion of the boil-off gas discharged from the storage tank to provide compressed boil-off gas;
a third compressor configured to compress a first flow out of the compressed boil-off gas from the at least one compressor;
a refrigerant decompressing device configured to expand a second flow of compressed boil-off gas flowing out of the at least one compressor;
a heat exchanger configured to heat-exchange the second flow flowing downstream the refrigerant decompressing device with the first flow flowing downstream the third compressor;
a liquefaction decompressing device configured to expand the first flow downstream the heat exchanger, in which at least part of the first flow liquefies; and
a fourth compressor configured to compress the second flow downstream the second heat exchanger for returning to the at least one compressor,
wherein the fourth compressor is driven by power generated from expanding of the second flow at the refrigerant decompressing device.

8. A boil-off gas treatment system of a ship including a storage tank storing liquefied gas, comprising:
a first supply line along which a part of boil-off gas discharged from the storage tank is compressed by a first compressor and then is sent to a fuel consumption place;
a second supply line which is branched from the first supply line, and has a second compressor installed thereon, the second compressor compressing the other part of the boil-off gas discharged from the storage tank;
a return line which is branched from the first supply line, the compressed boil-off gas being additionally compressed by a boost compressor and then passing through a first heat exchanger, a second heat exchanger, and a first decompressing device to be re-liquefied;
a recirculation line along which the boil-off gas cooled by passing through the second heat exchanger and a refrigerant decompressing device is sent back to the second heat exchanger to be used as a refrigerant; and
an additional compressor which is installed on an upstream of the second compressor to compress the boil-off gas,
wherein the additional compressor is driven by power generated from expanding of a fluid by the refrigerant decompressing device, the first heat exchanger heat-exchanges and cools the boil-off gas supplied along the return line after being compressed by the boost compressor by the boil-off gas discharged from the storage tank as the refrigerant, the second heat exchanger heat-exchanges and cools both of the boil-off gas supplied along the recirculation line and the boil-off gas supplied along the return line by the boil-off gas passing through the refrigerant decompressing device as the refrigerant.

9. The boil-off gas treatment system of claim 8, wherein the additional compressor is installed on the second supply line.

10. The boil-off gas treatment system of claim 9, further comprising: a first additional line connecting between the recirculation line on the downstream of the refrigerant decompressing device and the second heat exchanger and the second supply line on an upstream of the second compressor.

11. The boil-off gas treatment system of claim 10, wherein the refrigerant cycle is of a closed loop in which the boil-off gas passes through the additional compressor, the second compressor, the second heat exchanger, the refrigerant decompressing device, and the second heat exchanger and is then supplied to the additional compressor via the first additional line is formed.

12. The boil-off gas treatment system of claim 10, wherein the boil-off gas compressed by the first compressor and the boil-off gas compressed by the second compressor may be joined, and a part thereof is re-liquefied along the return line, the other part passes through the second heat exchanger, the refrigerant decompressing device, and the second heat exchanger along the recirculation line and is then be discharged from the storage tank to be joined with the fluid passing through the first heat exchanger, and the remaining part thereof may be supplied to the fuel consumption place.

13. The boil-off gas treatment system of claim 10, wherein a part of the boil-off gas compressed by the first compressor is re-liquefied along the return line and the other part thereof is supplied to the fuel consumption place, and the boil-off gas compressed by the second compressor passes through the second heat exchanger, the refrigerant decompressing device, and the second heat exchanger along the recirculation line and is then discharged from the storage tank and is joined with the a fluid passing through the first heat exchanger.

14. The boil-off gas treatment system of claim 8, further comprising:
a second additional line which is branched from the recirculation line on the downstream of the additional compressor and connected to the first supply line on the upstream of the first compressor;
a third additional line which is branched from the first supply line on the downstream of the first compressor and is connected to the recirculation line on the upstream of the refrigerant decompressing device and the second heat exchanger; and
a fourth additional line which is branched from the second supply line on the downstream of the second compressor and connected to the return line on the upstream of the boost compressor,
wherein the additional compressor is installed on the recirculation line on a downstream of the refrigerant decompressing device and the second heat exchanger, wherein the refrigerant cycle is of a closed loop in which the boil-off gas is configured to circulate the second compressor, the second heater, the refrigerant decompressing device, the second heat exchanger, and the additional compressor is formed.

15. The boil-off gas treatment system of claim 14, wherein the refrigerant cycle of the closed loop in which the boil-off gas is compressed by the second compressor and then passes through the second heat exchanger, the refrigerant decompressing device, the second heat exchanger, and the additional compressor along the recirculation line and is supplied back to the second compressor is formed.

16. The boil-off gas treatment system of claim 14, wherein the refrigerant cycle of the closed loop in which the boil-off gas is compressed by the first compressor and is then supplied to the second heat exchanger along the third additional line and the recirculation line, and passes through the refrigerant decompressing device, the second heat exchanger, and the additional compressor and is supplied back to the first compressor along the second additional line is formed.

17. A method of operating a boil-off gas treatment system in a ship comprising:
providing the boil-off gas treatment system of claim 8;
branching the boil-off gas discharged from the storage tank and compressing one flow of the branched boil-off gas by the first compressor and the other flow by the second compressor, additionally compressing and re-liquefying the boil-off gas, which is compressed by the first compressor, by the boost compressor and then returning the re-liquefied boil-off gas to the storage tank;
circulating the boil-off gas compressed by the second compressor through the refrigerant cycle to use the boil-off gas compressed by the first compressor as a refrigerant; and
compressing a fluid circulating the refrigerant cycle by the boost compressor and then supplying the compressed fluid to the second compressor.

* * * * *